Oct. 15, 1957        H. M. FLEMING        2,809,782
DELAYED CARRIAGE RETURN CONTROL MEANS FOR LISTING CALCULATORS

Filed June 17, 1953        9 Sheets-Sheet 1

INVENTOR
HOWARD M. FLEMING
BY *Elmer W. Edwards*
AGENT

INVENTOR
HOWARD M. FLEMING
BY *Elmer W. Edwards*
AGENT

Oct. 15, 1957          H. M. FLEMING          2,809,782
DELAYED CARRIAGE RETURN CONTROL MEANS FOR LISTING CALCULATORS
Filed June 17, 1953                                9 Sheets-Sheet 5

INVENTOR
HOWARD M. FLEMING
BY
AGENT

Oct. 15, 1957 H. M. FLEMING 2,809,782
DELAYED CARRIAGE RETURN CONTROL MEANS FOR LISTING CALCULATORS
Filed June 17, 1953 9 Sheets-Sheet 6
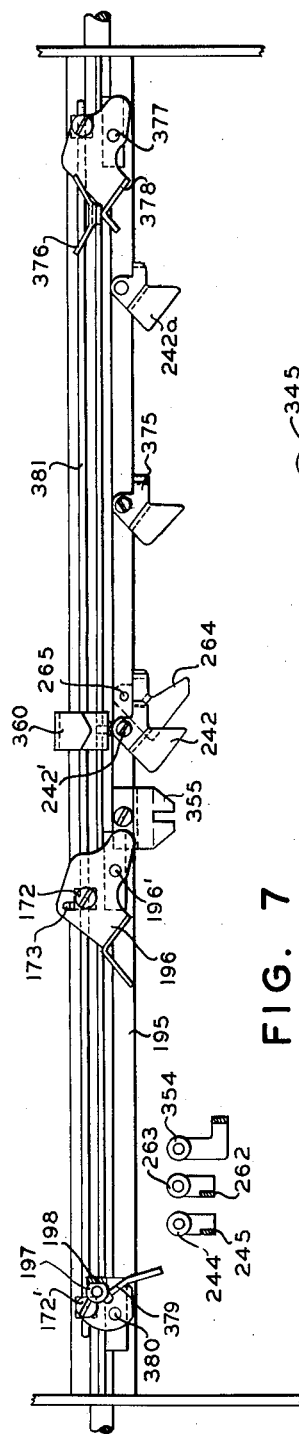
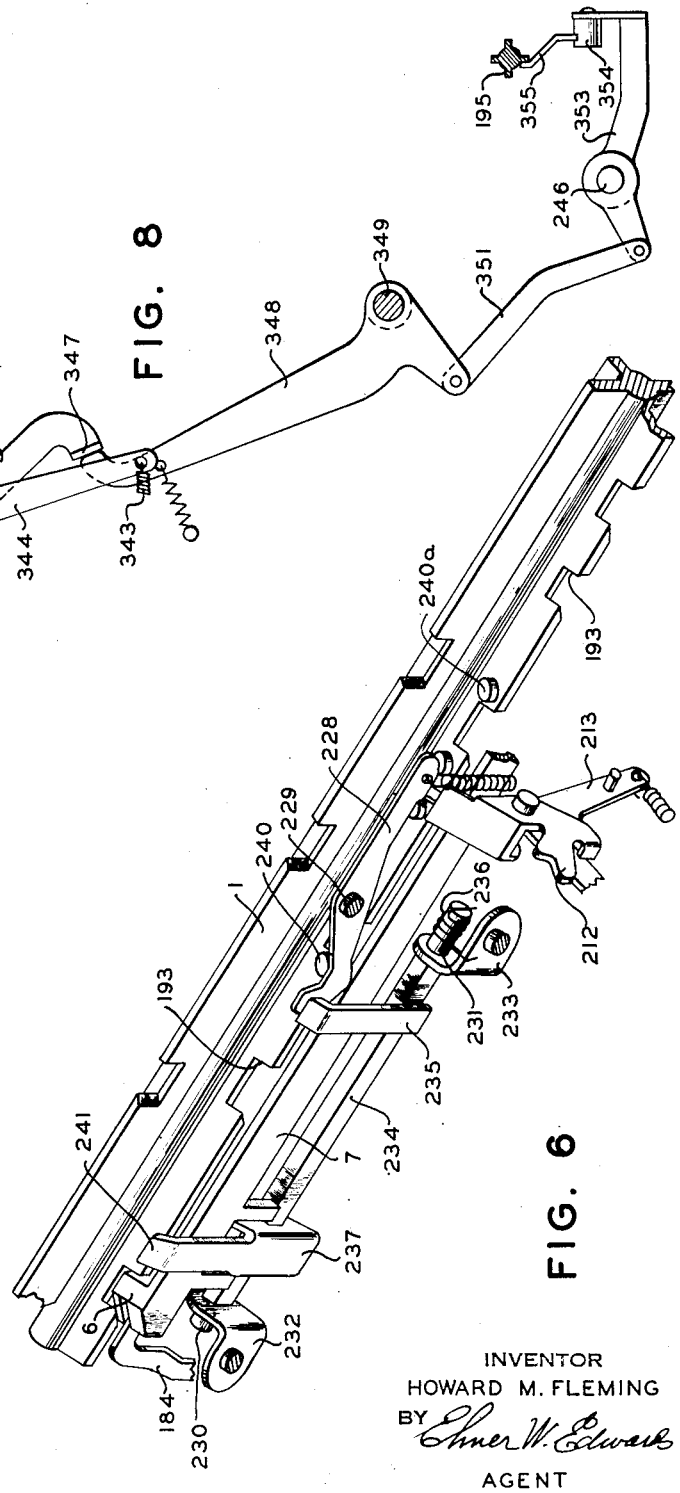
INVENTOR
HOWARD M. FLEMING
BY Elmer W. Edwards
AGENT

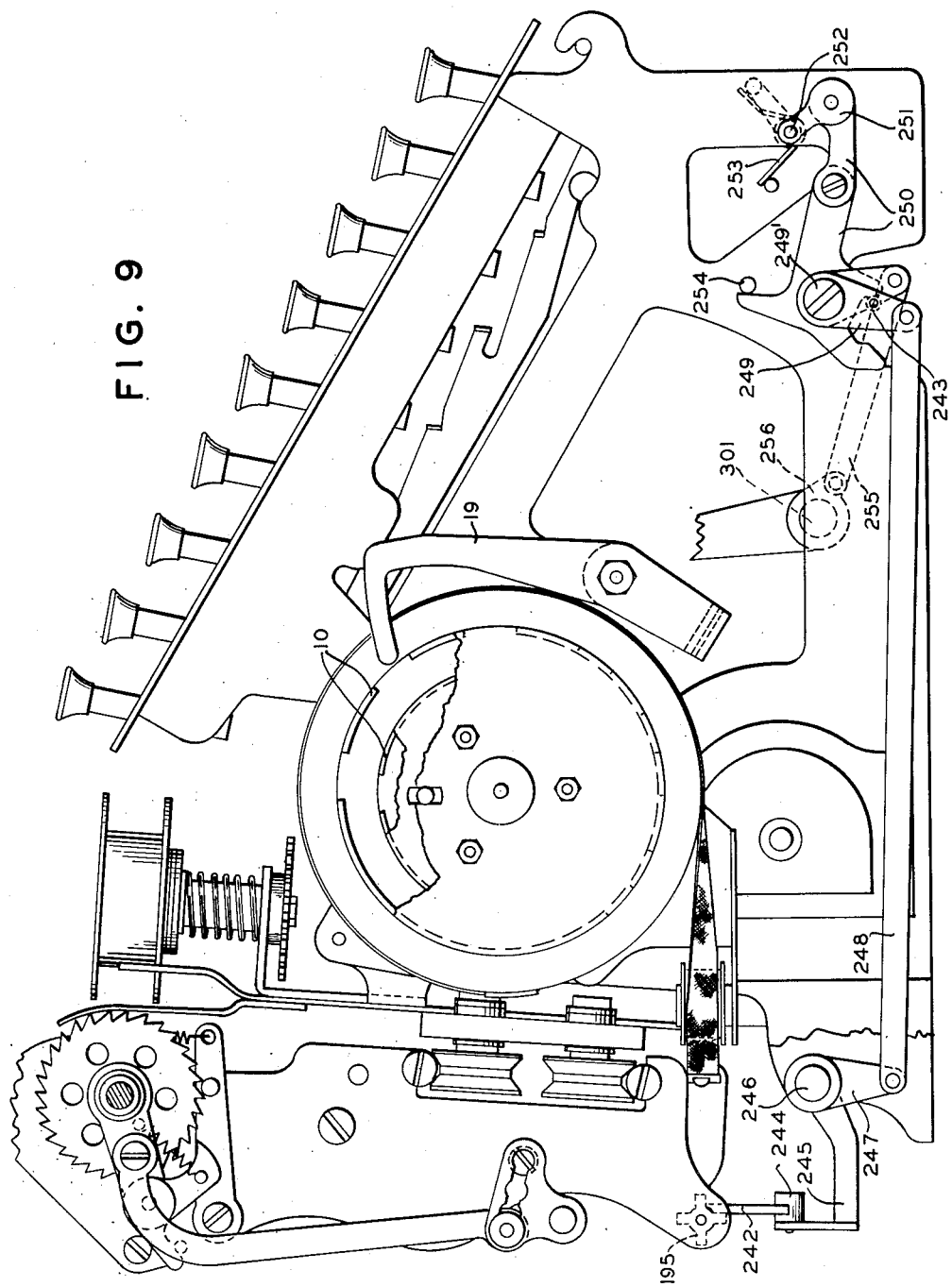

Oct. 15, 1957 H. M. FLEMING 2,809,782
DELAYED CARRIAGE RETURN CONTROL MEANS FOR LISTING CALCULATORS
Filed June 17, 1953 9 Sheets-Sheet 8

INVENTOR
HOWARD M. FLEMING
BY *Elmer W. Edwards*
AGENT

INVENTOR
HOWARD M. FLEMING
BY Elmer W. Edwards
AGENT

United States Patent Office 2,809,782
Patented Oct. 15, 1957

2,809,782

DELAYED CARRIAGE RETURN CONTROL MEANS FOR LISTING CALCULATORS

Howard M. Fleming, West Orange, N. J., assignor to Monroe Calculating Machine Company, Orange, N. J., a corporation of Delaware Application June 17, 1953, Serial No. 362,380

31 Claims. (Cl. 235—60.42)

The invention relates to listing calculators and more particularly to improved control devices for automatically controlling operations of the platen carriage for such machines whereby data entered into said machine and the results obtained by calculations performed thereby are printed in a certain advantageous manner upon columnar form sheets such as the statement and ledger sheets used in accounting or bookkeeping work.

Heretofore, automatic control of an operation of the platen carriage return means has been dependent upon an operation of the carriage, either directly through a movement of the carriage, or by means supported on the carriage which are brought into cooperative position by the carriage movement, to be subsequently operated by a manually operated key, or by power devices operable under control of said key, which act to trip the carriage return clutch.

The present invention provides a simple means, under control of certain selective operating keys and operable by the cyclic devices, for automatically initiating an operation of the carriage return clutch following a second cycle of machine operation, which means is entirely independent of control by the carriage. Such means, therefore, requires no special means on the carriage for controlling the return operations and is operable regardless of the columnar position in which the carriage may be located.

One object of the invention is to provide an improved machine of the class specified which is particularly adapted for the posting of amounts upon a customer's statement sheet, and to automatically reprint said amounts upon a ledger sheet in original print.

Among other uses to which the invention may also be advantageously applied is to accomplish automatically a return of the platen carriage from selective columnar positions such as required for well known bank posting routines wherein analysis records are made for charges which occur in the handling of certain items of an account. Other objects and advantages will also be noted. The invention consists in the novel construction and combination of parts as herein set forth in a preferred embodiment in the following description with reference to the accompanying drawings and defined in the appended claims.

In the drawings:

Fig. 6 is a front perspective view of a portion of the platen carriage locating means showing part of the notched tabulator bar and the means for controlling the reengagement of the locating means with said bar;

Fig. 7 is a front view of cam shoes supported within the platen carriage and adapted for controlling various machine functions;

Fig. 8 is a detail right-hand elevation of means controlled by the carriage for disabling the clearout devices;

Fig. 9 is a left-hand elevation of program means under control of the platen carriage for determining register operations;

General structure

Figure 3:
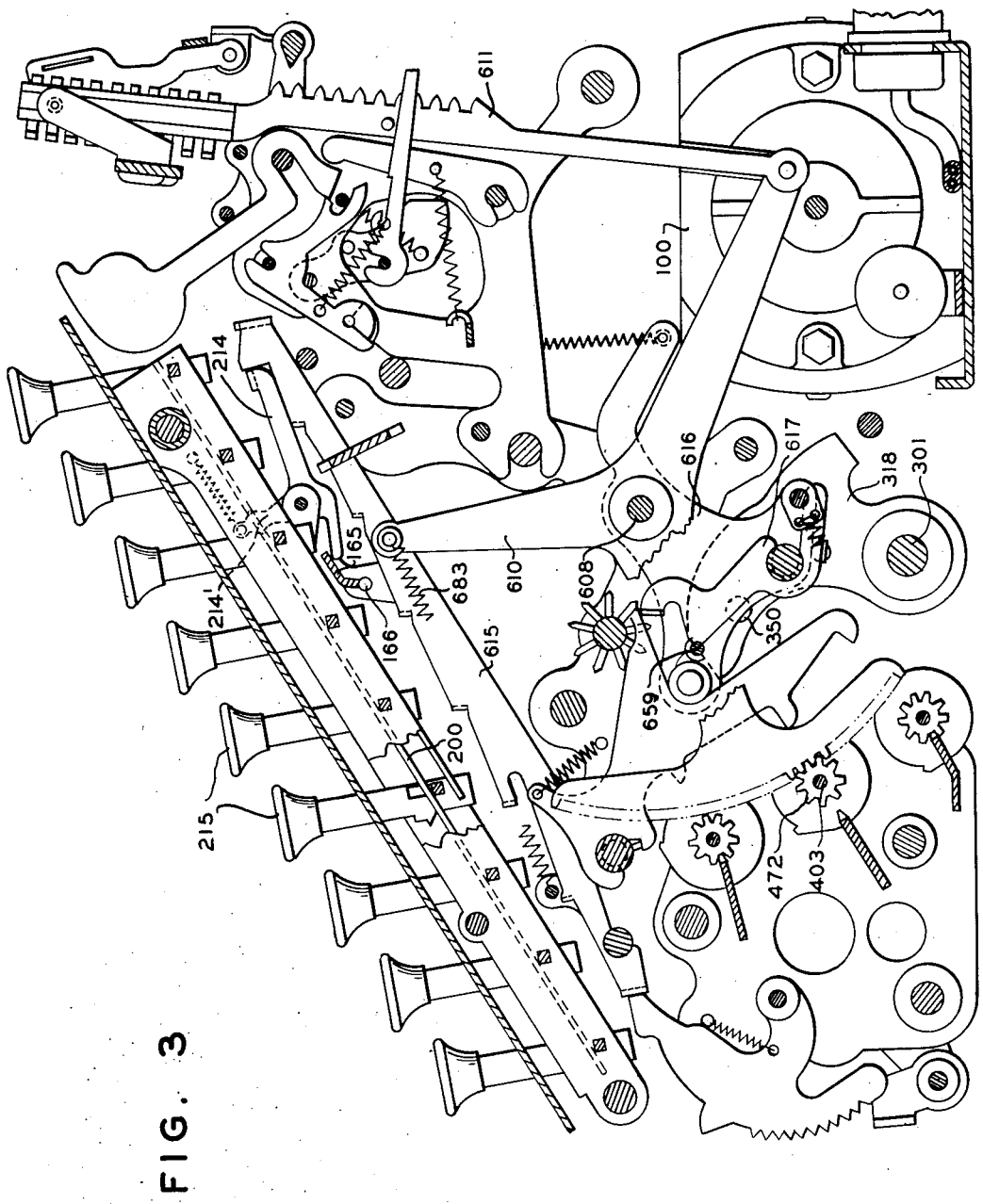
Fig. 3 is a right-hand cross sectional elevation view taken substantially through the center of the machine showing the keyboard, register actuating, and printing means.

The adding listing machine to which the invention is shown as applied is of well known type illustrated in U. S. Patent No. 1,946,572, issued February 13, 1934, to Loring P. Crosman and entitled Listing Calculator, and Patent No. 2,570,931, issued October 9, 1951, to Howard M. Fleming, and entitled Printing Tabulating Mechanism. It will be sufficient to describe the machine proper very generally and to say that for each denominational order the machine is provided with a three armed differential actuator lever numbered 610 (Fig. 3), loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys 215 are depressible to represent a value and when depressed are latched in position with the bottoms of their stems lying in the path of movement of the related stop lugs of the bars 615, and allow such bars to advance a distance proportionate to the value of the depressed key, upon operation of the machine. Depression of a digit key will also remove a column latch 214 from the path of movement of its related bar 615, which latches prevent movement of a stop bar lever 610 in any column in which no key is depressed.

A rock shaft 301 is provided with cam means 318 for governing the movement of a spring tensioned rocker frame 616, carrying a series of dogs 617, normally engaged by stud 659 of the lever 610. As shaft 301 is rotated forwardly (counterclockwise, Fig. 3) frame 616 will be rocked about shaft 608, and any of the levers 610 which have been released by depression of digit keys 215 will be allowed to rotate, under the influence of their springs 683, until they are stopped by the lugs of bar 615, contacting with the stems of the keys. Upon rearward (return) rotation of shaft 301, the dogs 617 will return the operated levers 610 to normal position. This excursion of levers 610 serves to register amounts set in the keyboard upon one or more accumulators and to set up a similar amount on the printing line of the type bars.

Figure 2:
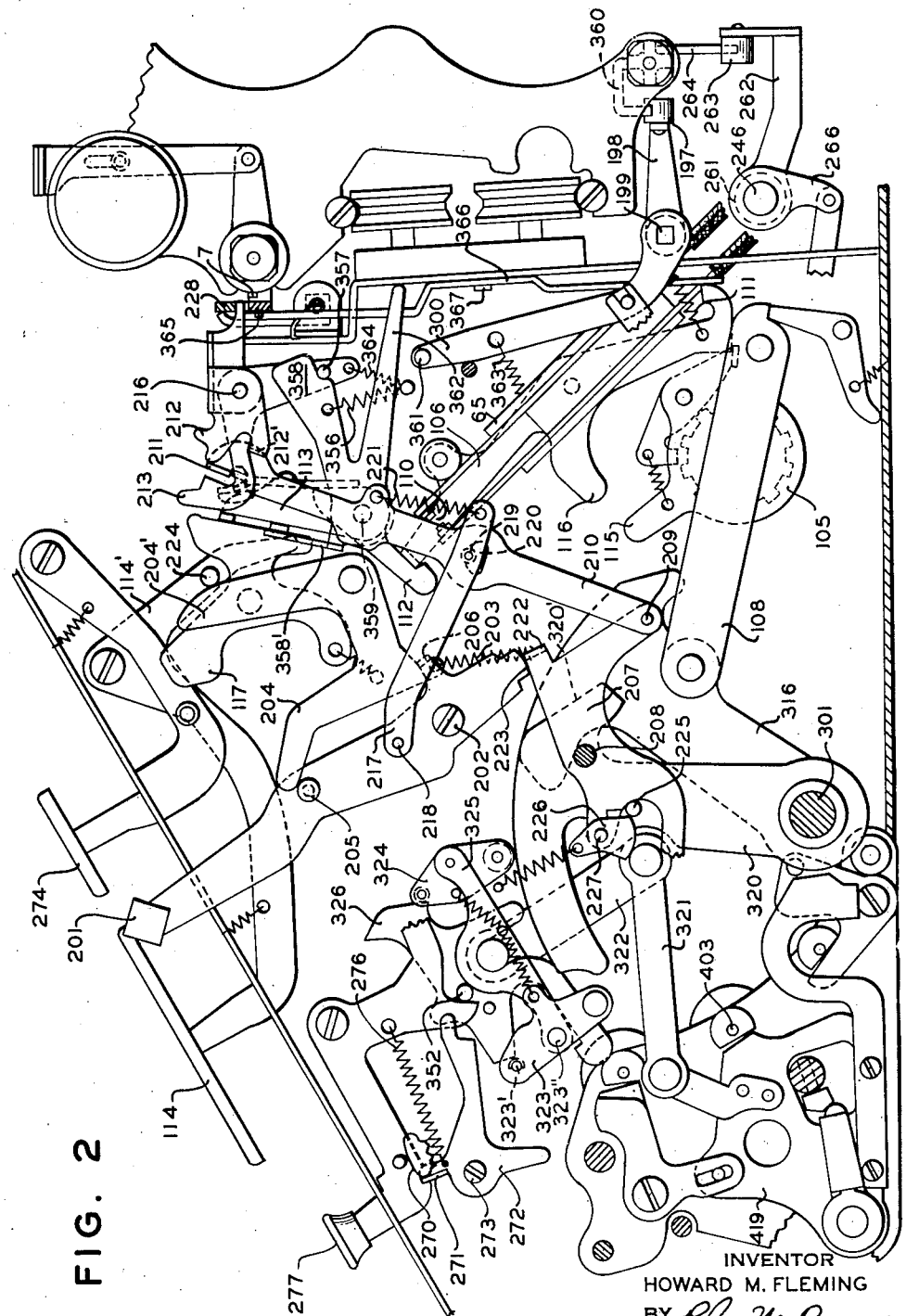
Fig. 2 is a right side elevation view of the cyclic operating devices and the control means therefor, the parts being shown in their normal position.

Shaft 301 is oscillated by an electric motor 100, connected through suitable gearing and clutch means, with a crank arm 105 (Fig. 2) connected by a rod 108 to an arm 316, fast upon shaft 301, so that as crank arm 105 is rotated, shaft 301 will be oscillated.

Motor operation is controlled by motor bars or keys through a clutch lever 106 which is provided with a roller adapted to close contact members 110 in the motor circuit after lever 106 is moved out of restraining engagement with the spring operated clutch. A spring 111 tends to pull lever 106 away from the clutch, the lever being normally held in clutch engaging position by means of a latch 112. Latch 112 is controlled by a trigger 113, lying in the path of movement of a lever arm 114' connected with an add key or plus bar 114. Upon depression of key 114, trigger 113 is rocked clockwise to release latch 112 and clutch lever 106 will be pulled out of engagement with the clutch to start the machine in operation.

Upon release of key 114, latch 112 will return under spring action into latching position and, toward the end of the cycle of operation, an arm 115 connected with the crank member 105 will contact a tooth 116 of the clutch lever 106 and will force said lever back into latching position, breaking the electric circuit and bringing the end of lever 106 into the path of movement of the rotating clutch member to terminate the cycle.

As more fully disclosed in the Crosman Patent 1,946,572, to which reference is made for complete details, during operation by the plus bar 114, the accumulator shafts 403 (Figs. 2–3) will be moved away from the racks of levers 610 before said racks are allowed to move, and will be moved to reengage the gears 472 while the racks lie in the extreme positions permitted by the keys 215 and stop bars 615. As shaft 301 is returned and the racks are raised, the value set in the keyboard will be additively transferred to the register.

A subtract key or minus bar 274 is located adjacent the plus bar 114. The free end of the subtract key lever is adapted to contact with and rock a plate 117 in a clockwise direction; said plate in turn also operates the trigger 113 to release latch 112 and start the machine in operation.

Also, as set forth in said patent, operation of the minus bar 274 will adjust suitable devices for changing the time at which the accumulators are shifted out of and into mesh with the segmental racks so that the accumulators remain in engagement during the first or downward stroke of the racks and are thereafter disengaged before the return stroke of said racks, and consequently register subtractively those amounts set up in the keyboard.

Column tabulating

Figure 5:
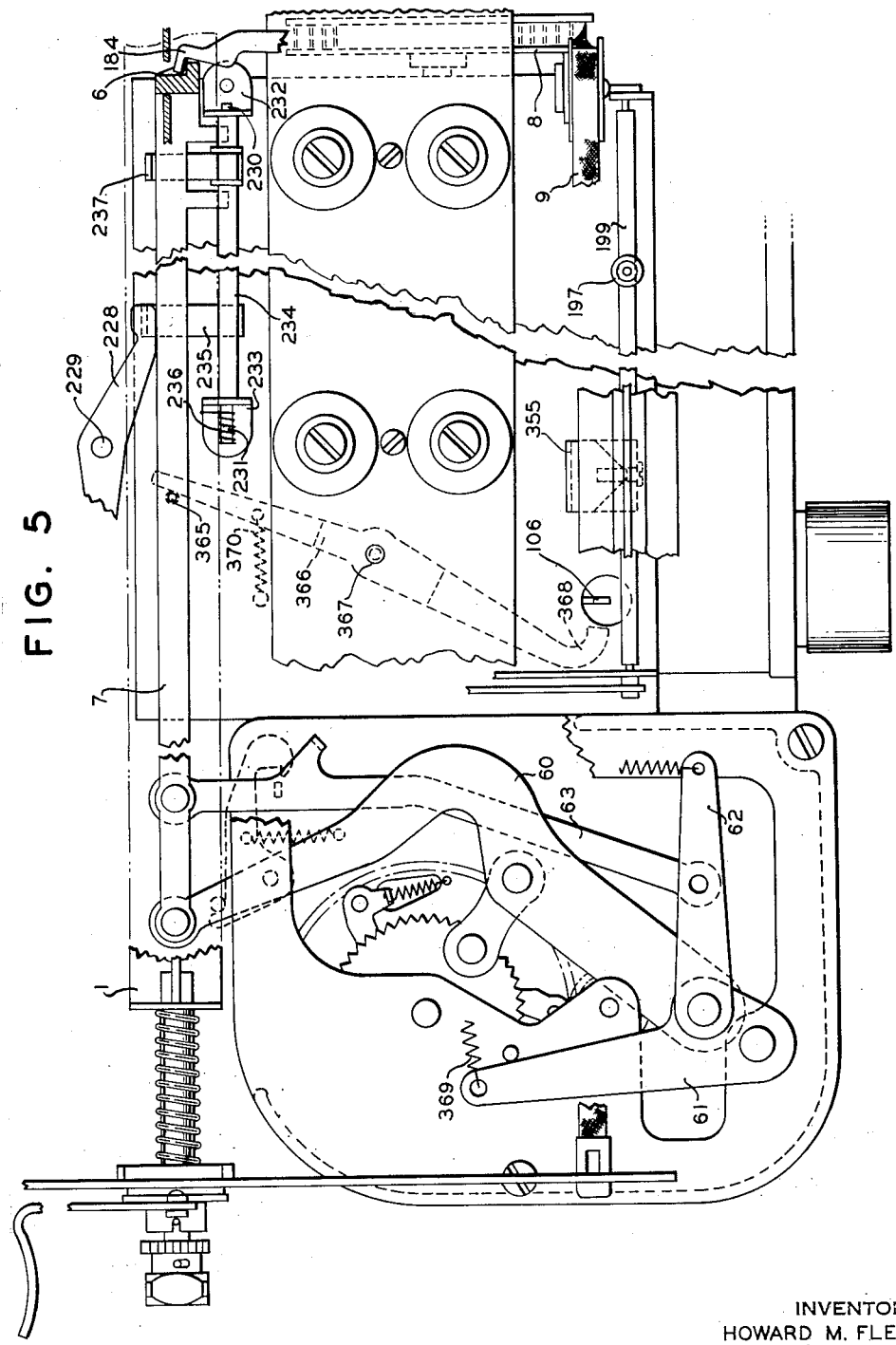
Fig. 5 is a fragmentary rear elevation view of the platen carriage showing the carriage locating means, and means for preventing an operation of the cyclic clutch until the carriage shifting movement is completed.

As described in U. S. Patent No. 1,946,572, to which reference is made for more complete details, the platen carriage of the machine is tabulated from right to left under the influence of a spring drum 8 (Figs. 1 and 5) connected to the carriage by a tape 9, the carriage being held in its various tabulating positions by means of the notched bar 1, the walls of the notches forming spaced stops 193 engageable successively by the end 6 of the detent 7 (see also Fig. 6) of a cushioned stop locator device having engagement with suitable variably spaced stop notches 193 of the notched bar 1 as set forth in reference Patent No. 2,570,931.

Under normal adjacent column tabulation, the detent lever 7 is tripped free of bar 1 and immediately released for reengagement with an adjacent notch of bar 1. More specifically, detent 7 is pivotally supported at its right end upon the upper end of a lever 60 fulcrumed upon a spring tensioned arm 61 forming, in effect, a yieldable extension of the frame of the machine. The free end 6 of detent 7 is held upwardly, in contact with the stops 193, by means of a spring urged arm 62 connected to the detent by a link 63. The detent is disengaged from bar 1 near the end of a machine cycle of operation by the downward movement of member 184, operated in known manner and as more particularly described in Patent No. 1,946,572. Upon release of bar 1 by the end 6 of detent 7, the carriage will be pulled toward the left (toward the right as viewed in Fig. 5) by the spring drum 8, and the detent, being immediately released by the member 184, will rise and ride on the under edge of bar 1. The carriage thereafter moves sufficiently to bring an adjacent one of the stop notches 193 of bar 1 into register with the end 6 of the spring arm 62, and contact the wall 193 of the adjacent notch to arrest the platen carriage.

For controlling a setting of the accumulators automatically in accordance with the columnar position of the record carriage, program mechanism is provided, including concentrically flanged discs on the drum 10 (Figs. 1 and 9) mounted for rotation with the spring drum 8 which carries the carriage shifting tape 9, the flanges of the drum 10 being cut away at intervals to provide perforations in the drum which are entered by suitable feelers 19 operable upon reciprocation of power shaft 301 during a cyclic operation of the machine. The perforations permitting variable extent of movement of said feelers act to control selection and adjustment of the accumulators for character of operation in well known manner and as set forth in detail in Patent No. 2,147,692 issued February 21, 1939, to Loring P. Crosman and entitled Listing Calculator.

Control means for skip column tabulating

Skip column tabulating is well known in the art and is used for many classes of work performed upon listing adding machines of the type herein disclosed. In such operations the means for releasing detent 7 for reengagement with bar 1 must be delayed until any of the notches 193 of bar 1 that are not to be effective are carried past the end 6 of detent 7.

One mode of operation involving skip column tabulation to which the present invention is particularly adapted is that of original or side by side posting in which the customer's statement sheet and the ledger sheet are posted in such a manner that both forms will be in original copy as will now be described.

Figure 1:
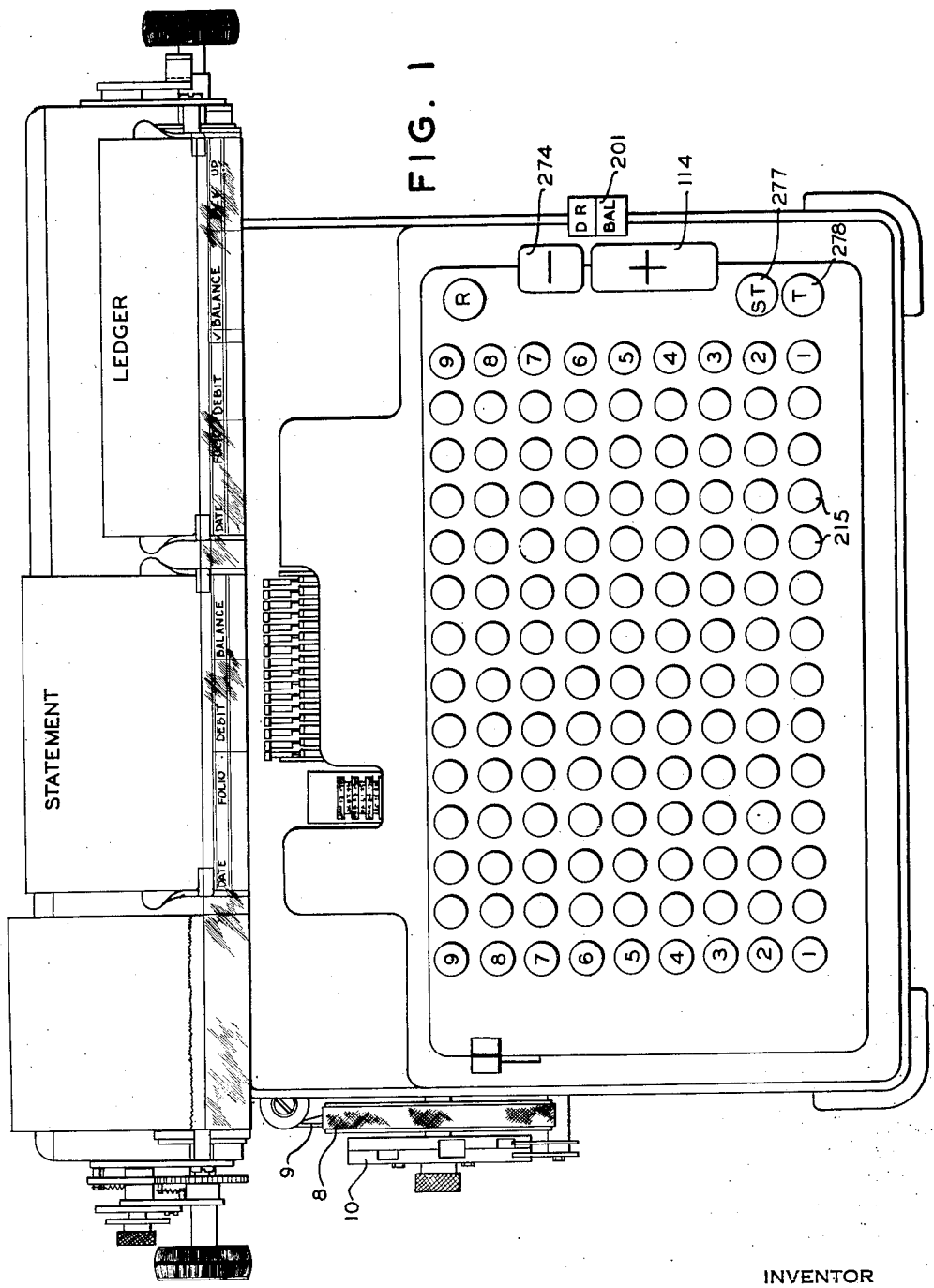
Fig. 1 is a diagrammatic plan view of a machine embodying the invention.

With the platen carriage in its extreme right-hand position as viewed by the operator and with the statement and ledger sheets (Figs. 1 and 10) together with either a journal sheet or the usual well known rewind tape for proof of posting, inserted into the carriage as shown in Fig. 1, an amount of $50.00 (taken from the ledger sheet and being the balance carried forward from a previous operation) is set up on the keyboard. This amount is accumulated upon a register and listed upon the proof tape at A through operation of a three position skip tabulating or balance key lever 201 (Fig. 2), in the manner to be described. As disclosed in the reference Patent No. 2,570,931, lever 201 is pivotally mounted at 202 to the right-hand framing of the machine and is normally held in its central position by means of a spring 203, connected at one end to a centralizing lever 204 which engages stud 205 and projection 206 of lever 201. The opposite end of spring 203 is connected to a bell crank lever 207 pivoted to the framing at 208 and serves to bias said lever in a counterclockwise direction.

Pivotally connected at 209 to the lever 207 is an upwardly extending finger 210 provided with a projection 211 normally positioned intermediate of levers 212 and 213, fulcrumed at 216 to the framing of the machine. An arm 217, pivotally connected at 218 to the operating lever 201 extends rearwardly and is provided with a pin 219 projecting into a triangular cam notch 220 of finger 210. A spring 221 connected to finger 210 and arm 217 biases said arm upwardly, forming a yieldable connection between operating lever 201 and finger 210. Lever 207 and finger 210 are held in lower position against tension of spring 203 by engagement of projection 222 of lever 207 with a lower arcuate edge 223 of operating lever 201.

During rearward movement of operating lever 201, arm 217 will be moved rearwardly and pin 219 engaging the rear cam face of cam notch 220 will cause arm 217 to yield downwardly. Further movement of lever 201 releases arcuate edge 223 from projection 222 whereupon spring 203 will impart counterclockwise movement to lever 207, moving finger 210 upwardly and rearwardly through pin and slot engagement 219, 220, the pin being urged upwardly by spring 221, to position projection 211 of said finger above the lever 212 for the purpose to be described.

A rearward arm 204' of centralizing lever 204 engages a pin 224 of the add key 114 and, during rearward movement of lever 201, pin 205 will rock lever 204 in clockwise direction to depress the add key and start the cycle of operation in the manner previously described, during which cycle the value $50.00 will be stored into the accumulator wheels and printed at A (Fig. 10) upon the record tape in well known manner. Also, during a cycle of operation the digit keys 215, which are latched in depressed position by engagement of suitable locking slide plates 200 (Fig. 3) with notches in the key stems, are released from the latching slides 200 by means of arm 214' of the column latches 214 engaging suitable projections of the slides 200. The latches 214 are operated by a bail 165 pivoted at 166 in the framing of the machine.

Releasing bail 165 is operated automatically during the later portion of a cycle of registering movement by well known means comprising lever 163 (Fig. 4) connected by link 162 with arm 316 fast to rock shaft 301, the free end of lever 163 engaging a stud 167 of a rocker 168, also pivoted at 166 to the framing of the machine. Rocker 168 carries a hook 170 pivoted thereto at 169, normally held by a suitable spring in position to engage a pin 171 in the end plate of bail 165. In the forward reciprocation of shaft 301 lever 163 will pass idly beyond stud 167 which is yieldably mounted on rocker 168, and upon rearward reciprocation of shaft 301 lever 163, contacting stud 167, will move the releasing bail 165 clockwise to release the depressed keys.

Operating lever 201 (Fig. 2) is held in operated position by projection 222 of lever 207, until released near the end of a cycle of operation in the following manner:

Mounted upon a cam arm 320 fast to rock shaft 301, is a pin 225, adapted upon return clockwise movement of cam 320 to engage the bottom edge of a one-way pawl 226, pivoted at 227 upon the lever 207, and to rock said lever in a clockwise direction. Clockwise movement of lever 207 will release lever 201 for restoration by centralizer 204, whereupon plus bar 114 is also permitted to return to its normal position and the machine cycle will be terminated as in the manner heretofore described.

During the above clockwise movement of lever 207 finger 210 is moved downwardly and projection 211, being positioned above lever 212, as previously described, rocks lever 212 counterclockwise which, through a rearward projecting end thereof, imparts a counterclockwise rocking movement to a lever 228 (Fig. 6) fulcrumed at 229 to the machine frame. The left lower edge of said lever slidingly engages the upper edge of detent 7 and during the above operation will depress detent 7 and disengage the forward end 6 thereof from the spaced stop surface of a notch 193 of tabulating bar 1 to release the platen carriage for tabulation. The restoration of lever 201 (Fig. 2) also, through pin and slot connection 219, 220, releases the projection 211 from lever 212.

Fulcrumed at 230—231 (Figs. 5 and 6) within brackets 232—233, secured to the stationary framing of the machine, is a square shaft 234 which has a latch arm 235 secured thereto. Arm 235 is held against the forward face of release lever 228 by a spring 236 adapted to impart clockwise rotation (as viewed from the right) to shaft 234. Mounted upon shaft 234 and adapted for rotation therewith is a finger 237 normally held rocked forward (counterclockwise) out of the path of a control pin 240, fast to the tabulator bar 1, by the above engagement of latch arm 235 with lever 228, which holds shaft 234 in counterclockwise direction against the action of spring 236.

Upon rocking of lever 228 to release detent 7 from bar 1, however, said lever is moved beneath arm 235, permitting said arm to rock rearwardly or clockwise with shaft 234. In this position arm 235 will engage the upper left top surface of release lever 228 and hold it in operated position. At the same time finger 237 is moved into the path of movement of the control pin 240 positioned upon the tabulator bar 1 corresponding to a spaced stop 193 of the columnar position to which the platen carriage is to be brought finally to rest.

As earlier set forth, upon release of detent 7 from a spaced stop 193, the platen carriage is shifted toward the left under influence of spring drum 8 and will now continue its movement until brought to rest by the engagement of pin 240 with the cam edge 241 of finger 237, said engagement serving to rock shaft 234 to disengage latch arm 235 from release lever 228 in time to permit reengagement of the end 6 of detent 7 with a stop edge 193 related to pin 240.

Upon completion of a machine cycle of operation performed under control of lever 201 therefor, the platen carriage will skip the date-folio-debit columnar position of the statement form sheet and will be brought to rest under control of a pin 240 which is positioned relative to the balance columnar position B (Fig. 10) of said sheet.

*Automatic total control devices*

As the carriage is being shifted, under influence of spring drum 8, to the balance columnar position a suitably placed cam shoe 242 (Fig. 7) pivoted at 242' upon the well known flanged program bar 195 supported within the end plates of the platen carriage will act to depress, and thereafter immediately release, a roller 244 mounted upon an arm 245 (Fig. 9) fast to a shaft 246 pivotally supported within the left and right end base framing of the machine. Fast to the left end of shaft 246 is an arm 247 having link connection 248 with an arm 249 pivotally mounted at 249' to the main framing and having a pin 243 engaging one link of a toggle device 250, the other link 250 of which is pivotally secured to an arm 251 fast to a shaft 252. Shaft 252 is normally tensioned under influence of a spring 253 for clockwise rotation, as viewed in Fig. 9 (counterclockwise as viewed in Fig. 4), said toggle link 250 being held against tension of spring 253 by a stud 254 fast to the framing of the machine.

As cam shoe 242 is carried past roller 244 during the above described movement of the carriage, however, the said cam imparts counterclockwise movement to the shaft 246 and through link connection 248 will trip toggle 250 upwardly beyond its toggle center position whereupon spring 253 then acts to complete the movement and impart a clockwise rotation to the shaft 252. As fully disclosed in Patent No. 1,994,211, issued March 12, 1935, to Loring P. Crosman and entitled Listing Adding Machine, there is secured on shaft 252, near the right-hand end, an arm 258 (Fig. 4) upon which is pivotally mounted at 257 a finger 259 provided with a projection 260 overlying the forward end of the total key 278, and upon the described operation of shaft 252 said finger acts to depress the total key.

A total is taken in well known manner by releasing the differential stop bars 615 (Fig. 3) and allowing their segment racks 610 to rotate the accumulators subtractively until suitable pins on the accumulator wheels contact with zero stop members. This will set the total (the amount subtracted from the accumulator wheels) in the type bars following which the totalizing device trips the cyclic clutch, whereupon the machine will be caused to cycle and the hammers will then be tripped to print the total. The bars 615 are then reengaged with the oscillating frame 616 and during the return stroke of the said frame the bars move rearwardly to normal position, the accumulator wheels being disengaged from the racks 610 before the return stroke is made, whereby the accumulator which has been totalized will stand at 0.

As well known in the art, and set forth in detail in U. S. Patent No. 2,070,785, issued February 16, 1937, to Loring P. Crosman and entitled Register, control of engagement of the accumulator wheels with the actuator levers 610 is by means of suitable cam plates 419 (Fig. 2) having link connection 321 with an arm 322 of a rocker device 325, provided with two cam followers 323—324 adjustable by key set control devices to different positions relative to cam arms 316 and 320 respectively of rock shaft 301.

The machine is set for a reverse or subtractive operation by contact of the total key lever 278 with a pin 352 on rocker control plate 326, the total key thus holding the plate out of the path of clockwise rotation of the forward cam follower 323, so that the accumulator will not be disengaged in the beginning of the operation, by the action of the cam arm 320. On the return stroke of the parts, the forward cam follower 323, co-acting with cam arm 320, will disengage the accumulator wheels from the actuator segments 610. In the above operation the described setting of plate 326 also disables the rear cam follower 324 while at the end of the cycle of operation a pin 350 (on cam 318, Fig. 3) will contact with arm 322 and restore rocker 325.

Also, during the cycle of operation toggle 250 (Fig. 9) is reset to normal position through means of a link 255 which connects the toggle device 250 with an arm 256 fast to the rock shaft 301.

In the present contemplated mode of operation, however, it is desired that at this time the balance value of $50.00 in column B be retained in the accumulator wheels. Special means to be described therefor are provided to modify the described total taking operation to a sub-total operation, wherein the accumulator wheels are also engaged with the actuator levers 610 during their return stroke of operation.

Control means for sub-total operation

Figure 4:
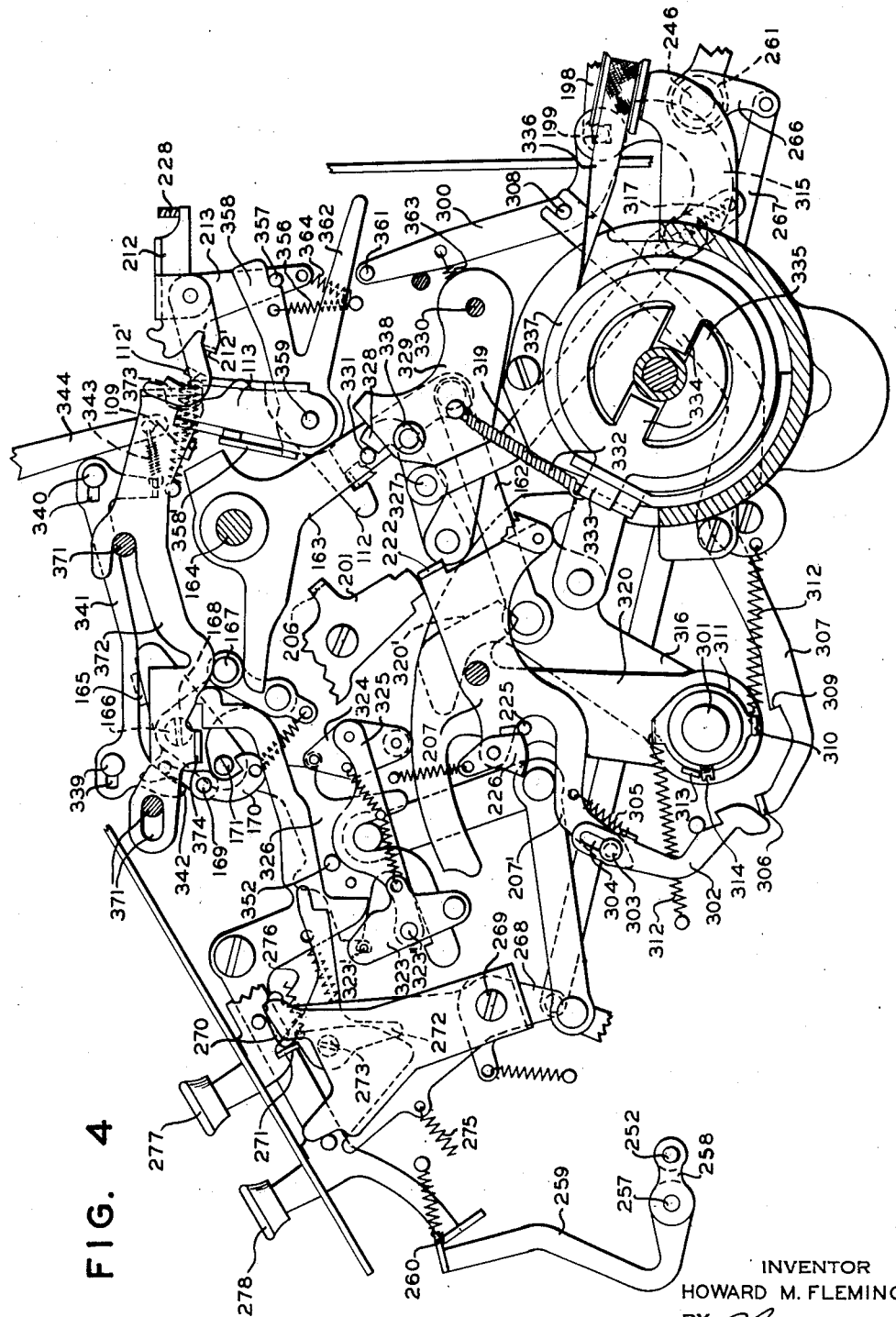
Fig. 4 is a right-hand elevation view of the means for controlling operation of the carriage return clutch.

Loosely mounted upon the shaft 246 (Figs. 2 and 4) is a sleeve 261, on the left end of which is secured a rearwardly extending arm 262. Arm 262 is provided with a roller 263 positioned in the path of movement of a cam member 264 pivotally mounted at 265 (Fig. 7) to the program control bar 195 of the carriage. Fast to the right end of sleeve 261 is a downwardly extending arm 266 having link connection 267 with the lower end of a lever 268, fulcrumed to the machine frame at 269. The upper arm of lever 268 is provided with a projection 270 engaging a lug 271 of a latch 272 pivotally mounted at 273 to the framing of the machine. A suitable spring 275 holds lever 268 rocked in a counterclockwise position, as shown in Fig. 4, wherein projection 270 normally holds latch 272 upwardly out of cooperation with a stud 323' of the forward cam follower 323.

In the tubulating movement of the platen carriage to the balance columnar position, cam member 264 is adapted to engage and depress roller 263, prior to the operation of roller 244 by cam shoe 242 in operating the total taking means.

Depression of roller 263, therefore, through arm 262, the sleeve 261, arm 266, link 267 and the lever 268 will release latch 272 for clockwise movement under influence of a spring 276 so that as the forward cam follower 323 is caused to be subsequently rocked clockwise about its fulcrum 323'', by a forward movement of the cam arm 320, latch 272 falls into engagement with the stud 323' to hold follower 323 out of cooperation with a return movement of cam arm 320.

Cooperation of cam arms 316 and 320 with cam followers 323—324 to control engagement of the accumulator wheels with the actuators 610 is well known in the art and described in detail in the reference patents, with particular reference to U. S. Patent No. 1,867,002, issued July 12, 1932, to Clyde Gardner, deceased. It will be sufficient to say that follower 323 is now held rocked in clockwise position by latch 272 out of cooperation with the rearward surface 320' of arm 320 in the return movement of said arm, whereby the register will remain in engagement with actuators 610 during their return movement and thus restores the value ($50.00) back into the accumulator wheels.

Automatic carriage return

A novel means is provided for controlling an operation of the well known power devices to automatically cause a return movement of the carriage to occur following the above operation, and which means is both simple in structure and entirely independent of any control by the platen carriage.

The lever 207 (Fig. 4) previously described is provided with a forwardly extending arm 207', said arm being provided with a yieldable pawl 302, secured thereto by means of suitable pin and slot connection 303—304. A spring 305 serves to hold pawl 302 with the bottom surface of slot 304 against pin 303 and to bias said pawl for counterclockwise movement against the forward edge of a lug 306 on the forward end of a link 307. The rearward end of link 307 has pivotal connection at 308 to an arm 300 fast to a square shaft 199 supported upon the rear framing of the machine. The link 307 is provided with a shoulder 309 positioned normally beneath the path of movement of a lug 310 bent laterally from a disc 311 loosely mounted upon rock shaft 301. Disc 311 is held against counterclockwise rotation, exerted through means of a pair of springs 312, by the engagement of a projection 313 of said disc with a pin 314 fast to the rock shaft 301.

It will be recalled, in the rearward movement of lever 201 for posting at (A) the amount ($50.00) of the old balance upon the proof tape, that lever 207 is caused to be rocked counterclockwise under influence of its spring 203. During this operation of lever 207 the pawl 302 is moved downwardly and, by means of spring 305, will snap under the lug 306 of link 307.

In a machine cycle of operation, incident to the above described operation of lever 201, shaft 301 is caused to be rocked counterclockwise and returned, as earlier described, and the pin 314 moving away from projection 313 permits counterclockwise movement of disc 311 by the springs 312, and thereafter pin 314 returns disc 311 upon the return movement of shaft 301. During its counterclockwise movement the lug 310 of disc 311 at this time passes idly above shoulder 309 of the link 307. It will be recalled that near the end of the return stroke of shaft 301 the pin 225 engages pawl 226 and rocks lever 207 clockwise to restore the lever 201. During said clockwise movement of lever 207, the pawl 302 thereof will now lift link 307 and position the shoulder 309 of the link into the path of movement of the lug 310 of disc 311, the link 307 thereafter being held in raised position through reengagement of projection 222 of lever 207 with the restored lever 201. Upon a second machine cycle of operation therefore, which, in the present instance, occurs at B (Fig. 10) during a sub-total printing of the old balance upon the statement sheet, the projection 310 (Fig. 4) engages shoulder 309 and will drive the link 307 rearwardly. Rearward movement of link 307 serves to impart clockwise movement to the arm 300 and thus to the square shaft 199, for controlling engagement of the carriage return clutch means in the manner as hereinafter described.

In the above described movement of link 307 the lug 306 thereof will be carried rearwardly out of engagement with the pawl 302. Projection 309 of link 307, however, is suitably undercut so that link 307 will remain in engagement with the lug 310 of disc 311.

Secured to the square shaft 199 is an arm 315 (Fig. 4) adapted during a clockwise movement of said shaft to tension a spring 317 secured to one end of a link 319. The opposite end of link 319 is pivotally connected at 327 to a latch 328, pivotally mounted upon a plate 329, pivotally secured at 330 to a suitable bracket fast to the machine framing.

Latch 328 is held by the tension of spring 317 against a stud 331 fast to the lever 163 mounted upon the transverse shaft 164. The lower end of lever 163 has link connection 162 with the arm 316, oscillated through link connection 108 by the motor driven crank arm 105, as earlier described. As lever 163 is rocked during the forward movement of cam 316, latch 328 is permitted, under influence of spring 317, to move into the path of a return movement of the stud 331.

Near the completion of the operating cycle of the machine, stud 331 will first engage the hook end of latch 328, to rock plate 329 upwardly about its fulcrum 330, and pin 314 of rock shaft 301 meanwhile reengages projection 313 to restore disc 311, releasing shoulder 309 of link 307 from lug 310.

Plate 329 has flexible link connection 332 with a clutch operating member 333 and, as plate 329 is rocked upwardly, link 332 will exert a twisting action to the clutch lever 333 whereby suitable projections 334 will tend to impart lateral movement to suitable friction discs 335 to cause operation of the well known carriage return clutch means. Operation of the carriage return clutch effects return movement of the platen carriage through means of a ribbon tape 336, one end of which is secured to the left end plate of the carriage and the opposite end being wound upon the drum 337 of the clutch, all as fully disclosed in reference Patent 1,946,572.

In the above described operation of plate 329 an insulated roller 338 mounted thereon causes engagement of the contact points 110 (Fig. 2) of switch 65 to close an electrical circuit to the motor.

*Means for interrupting a carriage return movement*

Figure 10:
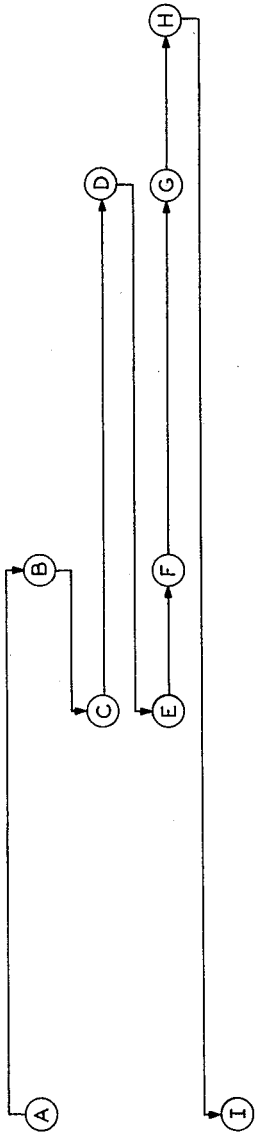
Fig. 10 is an illustration of one example of work performed by the machine, including a schematic illustrating the sequence of operations of the platen carriage in performing the work.

During return movement of the carriage from position B a cam shoe 196 (Fig. 7) pivotally mounted at 196' upon flanged bar 195, and being located relative to the debit columnar position on the statement sheet, will engage the now depressed roller 197 of arm 198 fast to shaft 199 and will restore shaft 199 counterclockwise (as viewed in Fig. 2) to disengage latch 328 (Fig. 4) from stud 331, permitting restoral of the clutch operating means and thereby terminating the carriage return movement at C, Fig. 10. It will be noted that during the described restoration of shaft 199 by cam shoe 196 said shoe is prevented from rotating about its fulcrum 196' through means of the locking effect of a pin 172 having engagement with an L-shaped slot 173 of shoe 196 as shown in Fig. 7.

Operation of square shaft 199 by the cam shoe 196 will also condition well known means to provide for an operation of the usual paper feed devices during the return movement of the carriage as fully described in reference Patent 1,946,572.

*Dual posting*

The machine having now come to rest with the debit column of the statement sheet in printing position C (Fig. 10), a debit amount ($25.00) is then set in the keyboard.

In the present mode of operation, it is desired that the debit amount be printed on the statement sheet and thereafter automatically reprinted in original copy upon the ledger sheet at position D. A machine cycle of operation, therefore, is initiated at position C by means of the operator imparting a forward movement of the operating lever 201.

As previously described, a projection 206 of operating lever 201 engages the lower edge of centralizing lever 204, and thus upon forward movement of lever 201 lever 204 will be rocked clockwise (Fig. 2) to depress the add key 114 and initiate a cycle of operation, during which cycle the debit amount ($25.00) is caused to be accumulated into the register and printed upon the statement sheet at C.

*Means for disabling clearout devices*

Since in dual posting operations the debit amount is to be subsequently reprinted automatically upon the ledger sheet, it is necessary during the debit statement printing operation at C that the keyboard clearout devices be disabled so that the debit value will remain as set in digit keys 215 for subsequent use in reprinting the debit value at position D upon the ledger sheet.

The clearout devices are disabled under control of suitable cam means on the platen carriage as follows:

Secured to the right-hand frame of the machine by pin and slot connections 339—340 (Fig. 4) is a slide 341 provided with a tooth 342 engaging the upper end of the hook 170, adapted for operating the clearout bail 165 in the manner earlier described. The rearward end of slide 341 has yieldable spring connection 343 with a downwardly extending arm 344 fast to a shaft 345 (Fig. 8) suitably supported within the framing of the machine. Secured to shaft 345 is a second arm 346 provided with a lateral projection 347 having engagement with one arm of a bell crank 348 pivotally mounted to the machine frame at 349. Bell crank 348 has link connection 351 with a forward arm of a lever 353 loosely mounted upon the shaft 246. The rearward end of lever 353 is provided with a roller 354 lying in the path of movement of a cam plate 355 secured to control bar 195. Cam 355 is positioned on bar 195 relative to the debit columnar position of the statement sheet so that, as the carriage tabulates into said position, plate 355 will impart a clockwise movement to the lever 353. Clockwise movement of lever 353, through link 351, bell crank 348 and arm 346 imparts counterclockwise movement to shaft 345 and the arm 344, whereupon spring 343 is tensioned to draw slide 341 rearwardly and tooth 342 thereof will rock hook 170 out of cooperation with pin 171, to disable the operation of clearout bail 165 by lever 163 during the statement debit printing operation C.

*Means for controlling carriage tabulation to reprint position*

As will be described a forward movement of operating lever 201 will also render ineffective the previously described stop means related to bringing the carriage to rest in the balance columnar position of the statement sheet so that upon release of the carriage following the statement debit printing cycle of operation the carriage now shifts through the balance columnar position and until brought to rest in the debit columnar position of the ledger sheet for operation D.

Forward movement of operating lever 201 (Fig. 2) acts through pin and slot connection 219—220 to raise and position the projection 211 of finger 210 above the lever 213 so that as finger 210 is subsequently restored at the end of the cycle of operation, in the manner as earlier described, projection 211 will rock the lever 213 counterclockwise. A projection 212' of the lever 212 underlies the lever 213 and during said operation of lever 213 lever 212 will also be rocked to release the carriage locator detent 7, as earlier described.

A downwardly extending arm of lever 213 (Fig. 4) is provided with a pin 357 engaging the lower edge of a latch member 358, pivotally mounted at 359 to the stationary frame of the machine. During the above operation of lever 213, pin 357 is carried rearwardly and latch 358, under influence of spring 356, is moved into position for holding the lever 213 and, through levers 212 and 228 (Fig. 6) also the detent 7 in their operated positions.

The earlier described engagement, therefore, of the control pin 240, related to the balance columnar position of the statement sheet, with the finger 237 will at this time be ineffective of releasing detent 7 and the carriage will shift through the balance columnar position and until stopped by engagement of finger 237 with a control pin 240a, related to the debit columnar position of the ledger sheet, the stopping devices being rendered effective as follows:

As the platen carriage moves between the balance column of the statement sheet and the debit column of the ledger sheet a trippet 360 (Figs. 2 and 7) fast to flanged bar 195 will engage the roller 197 and trip arm 198 to impart a reciprocatory movement to the square shaft 199, which is pivotally supported upon the rear framing of the machine as earlier described. Secured to the right end of shaft 199, as earlier set forth, is an arm 300 and said arm is provided with a pin 361 adapted upon rearward movement of arm 300 to engage an arm 362 of the latch member 358. Engagement of trippet 360 with roller 197 will rock arm 198, shaft 199, and arm 300 in a clockwise direction (Fig. 2) and, as trippet 360 moves free of roller 197 in the movement of the carriage, said parts are immediately restored counterclockwise by a suitable tension spring 363 attached to arm 300.

During the described excursion of arm 300, pin 361 will engage arm 362 and rock latch 358 upwardly free of pin 357, whereupon lever 213 is restored by its spring 364, and pin 357 will again be positioned beneath latch 358, holding the latch in normal position. The restoration of lever 213 will free lever 212 from holding release lever 228 and the detent 7; however, latch arm 235 (Fig. 6) will now hold lever 228 and detent 7 in their operative positions until released by the engagement of control pin 240a with finger 237, to bring the carriage to rest in the debit columnar position D of the ledger sheet, in the manner as set forth for control pin 240 related to the balance column of the statement sheet.

*Means to effect automatic debit reprint operation*

As above set forth a forward operation of lever 201 to its repeat debit position provides for a subsequent operation of the lever 213, during which operation the pin 357 of lever 213 releases latch 358 for a clockwise movement by its spring 356. In the clockwise movement of latch 358, an upwardly extending arm 358' of said latch is moved rearwardly against trigger 113 of latch 112 and holds latch 112 in its rocked position out of engagement with the clutch lever 106. Supplemental means are provided, however, to hold up a second cycle of operation until after the carriage completes its tabulating movement.

Fast to the detent 7 (Fig. 5) of the carriage locating devices, earlier described, is a pin 365 having engagement with a lever 366 pivoted upon the rear casing of the machine at 367. With the platen carriage in a normal position of rest, pin 365 will hold lever 366 in a clockwise direction, as viewed in Fig. 5, wherein a projection 368 on the lower arm of said lever is held out of cooperative position with the lower arm of the clutch lever 106. Upon disengagement of detent 7 from the tabulating bar 1 of the carriage, however, said detent is caused to move toward the left, under influence of spring 369, and pin 365 thereupon releases lever 366 for a counterclockwise movement by its spring 370.

As projection 115 of crank arm 105 restores the clutch lever 106 near the end of the statement debit printing cycle of operation, lever 366 will snap to a position in rear of lever 106 and hold said lever in clutch disengaging position. After the platen carriage has skip tabulated through the balance columnar position, the latch 358 is restored by engagement of trippet 360 with roller 197 to stop the carriage in the debit columnar position of the ledger sheet, as described. During restoral of latch 358 arm 358' releases latch 112 so that said latch will fall and rest upon the slightly displaced lever 106. A subsequent reengagement of detent 7 with the notched bar 1 as the carriage completes its movement to the debit columnar position, then restores the detent toward the right, whereupon pin 365 restores lever 366 out of engagement with clutch lever 106, thereby permitting operation of the cyclic clutch devices, to effect an automatic cycle of operation and reprint the debit value $25.00 at D.

*Means to disable the automatic total devices*

During the described movement of the platen carriage to the debit reprint columnar position, the automatic total devices earlier described must be rendered ineffective so that no totalizing operation will occur as the carriage tabulates through the balance columnar position of the statement sheet.

Secured by pin and slot connections 371 (Fig. 4) to the right-hand frame of the machine is a slide 372, the rearward end of which is provided with a projection 373 having engagement with the trigger 113 and also with an upwardly extending arm 112' of the clutch latch member 112. In normal position of rest, the latch 112 is held counterclockwise by its spring 109 and arm 112' holds slide 372 in a forward position, wherein a lug 374 of said slide is positioned forwardly out of cooperation with the rearward end of the total key 278. Upon rearward movement of trigger 113 and of latch 112 during operation of lever 201 above described, however, trigger 113 moves slide 372 rearwardly and lug 374 is carried therewith to a position above the rearward end of the total key 278, thereby locking said key against operation. It is recalled that a rearward operation of lever 201 provides for release of pin 357 from latch 358 near the end of the cycle of operation and that said latch is then rocked clockwise by spring 356. Upon clockwise movement of latch 358, arm 358' will act to hold trigger 113 and latch 112 in rocked position and thereby holds slide 372 in rearward locking position while the carriage is tabulating.

As the carriage tabulates through the balance columnar position the automatic total cam shoe 242 (Figs. 7 and 9) will act to trip the toggle means 250, as earlier described. In the present instance, however, the total key now being locked against operation, no totalizing action is effected. Upon continued movement of the platen carriage and following the operation of cam shoe 242 in tripping the total taking means, the trippet 360 then acts to engage roller 197 to reciprocate arm 300 for releasing latch 358, in the manner as earlier set forth.

It will be noted, however, that although latch 358 and arm 358' have been restored, nevertheless, the slide 372 will remain in rearward position against the tension exerted by spring 109, due to the friction of total key 278 against lug 358 as exerted by toggle spring 253 (Fig. 9). Latch 112, therefore, will be held out of engagement with the clutch lever 106 until toggle 250 is restored during the subsequent debit reprint cycle of machine operation, in the manner as earlier described, causing the total key 278 to release slide 372 for forward movement by spring 109 and unlocking said total key. A recycling operation of the machine, however, will be delayed until after the carriage has completed its tabulating movement, as previously described.

During the automatic cycle of operation described, the debit item ($25.00) is reprinted in original copy upon the ledger sheet at D, and since in this columnar position of the carriage there is no cam shoe 355 to cooperate with roller 354 for disabling the clearout means, the digit keys 215 are restored in this operation in the usual manner. In the debit reprint position of the carriage, the register operations control drum 10 (Fig. 9) will effect control of the feelers 19 for a non-add operation of the accumulator wheels, so that the debit value will not be caused to be entered into the accumulator a second time.

During the cycle of operation initiated by a forward operation of lever 201 for printing the statement debit entry ($25.00) at C, the shoulder 309 (Fig. 4) of link 307 is positioned rearward of the lug 310 of disc 311 as described for a rearward operation of lever 201, and upon the subsequent cycle of operation to reprint the debit item ($25.00) at D upon the ledger sheet, lug 310 again imparts clockwise movement, through link 307 and finger 300, to the shaft 199 for effecting operation of the carriage return clutch. During return movement of the carriage, the paper feed devices are operated and the carriage brought to rest relative to the debit columnar position of the statement sheet, all as in the manner earlier described.

It will be noted that in a return movement of the platen carriage the cam shoes 242 and 264 engage their respective rollers 244 and 263, but are merely rotated idly about their pivot supports so that the total taking devices will not be activated by a return movement of the carriage.

From the above description of the invention, it will be seen, therefore, that for a plurality of debit items to be posted, the operator need only to set the debit value upon digit keys 215 and operate lever 201 forwardly for each item, whereupon the machine thereafter, with full automaticity, will accumulate the value into the register, post said value upon the statement sheet, skip tabulate through the balance printing position to the debit columnar position of the ledger sheet, reprint the posted amount upon the ledger in original copy and without duplicating the registration, and thereafter return the platen carriage to a position of rest relative to the debit columnar position of the statement sheet, and during which return movement, the statement and ledger sheets will be indexed ready for the next item.

*Final debit item*

When the operator notes that a final debit item ($15.00 at position E, Fig. 10) is to be posted, the operator, in lieu of manipulating lever 201, will initiate the operation through means of the plus bar 114 so that upon completion of the posting cycle of operation at E the carriage, in place of skip tabulating, will now tabulate in the usual manner to an adjacent columnar position F, which column corresponds to the balance column of the statement sheet. The machine will then perform the automatic sub-total operation, as in the manner previously described, to print the new balance total $90.00 upon the statement sheet at F, following which the carriage will again tabulate in regular manner to the next adjacent columnar position G, corresponding to the debit column on the ledger sheet.

In the above described sub-totaling operation, the debit value of $15.00 remains set in digit keys 215, for future use in the debit reprint operation in position G, and since the stop bars 615 must be free to move without conflict with the depressed keys 215, the stop bars 615 are caused to be shifted laterally in totalizing operations in well known manner and as fully set forth in U. S. Patent No. 2,087,182, issued July 13, 1937, to Loring P. Crossman, entitled Listing-Adding Machine, to which reference is made for details of operation and structure not specifically described in the present specification.

In the above described sequence of operations, latch 358 with arm 358' has remained in normal counterclockwise inoperative position; therefore, the latch 112 at the conclusion of a cycle of operation is permitted to re-engage clutch lever 106 in the usual manner in terminating an operation. Special means, therefore, to be described, are provided for controlling an automatic reprint cycle of operation at this time to reprint the debit value $15.00 at G upon the ledger sheet.

A trippet 375 (Fig. 7) is pivotally secured to control bar 195 in such position that as the carriage tabulates between the balance columnar position of the statement sheet and the debit columnar position of the ledger sheet, said trippet will engage roller 354 and impart a rocking movement to the shaft 345 (Fig. 8) of the non-clear devices earlier described. As shown in Fig. 4, the arm 344 fast to shaft 345 is spaced forwardly of the projection 373 of the total key locking slide 372. Trippet 375 is designed to impart a greater extent of movement to shaft 345 than that imparted by the non-clear trippet 355 earlier described, and in this extended movement, the arm 344 engages projection 373 to move slide 372 rearwardly. Upon rearward movement of slide 372, the projection 373 of said slide will engage arm 112' of latch 112 and rock said latch out of engagement with the clutch lever 106. The carriage, however, being in transit between columnar positions, the lever 366 (Fig. 5) again interrupts movement of clutch lever 106 and prevents engagement of the cyclic clutch means until the platen carriage completes its tabulating movement and restores lever 366, thereby releasing lever 106 to start the reprint operating cycle, as in the manner previously described.

Following the final debit item reprint cycle of operation, the carriage tabulates in regular manner to an adjacent columnar position H, said position now corresponding to the balance column on the ledger sheet and being the final leftward columnar movement of the carriage. In this position of the carriage, a second automatic total taking control cam 242ᵃ trips roller 244 to effect an automatic total taking operation, during which the new balance $90.00 is caused to be reprinted at H upon the ledger sheet in original copy and there being no sub-total modifying control cam 264 related to this position of the carriage, the accumulator wheels will remain zeroized.

Having now completed a posting of the statement and ledger sheets wherein both forms are printed in original copy, the carriage may then be returned to its starting columnar position I, either by hand or by power under control of the usual carriage return key in well known manner.

*Last place automatic carriage return means*

Preferably, however, well known last place automatic carriage return means are employed which means in the present invention, however, includes devices for automatically controlling the cam shoe 196, earlier described in connection with interrupting a return movement of the carriage at the debit columnar position of the statement sheet, so that at this time the carriage will complete its return movement until brought to rest in the original left-hand starting columnar position at I, as will now be described.

As the carriage shifts into its final tabulated position, the usual cam shoe 376 secured to bar 195 will act to depress roller 197 and tension latch 328 (Fig. 4) for subsequent engagement with pin 331 to effect an operation of the return clutch, as in the well known manner earlier described.

Pivotally mounted at 377 to the flanged bar 195, and positioned beneath the cam shoe 376 as shown in Fig. 7, is a cam shoe 378. Upon depression of roller 197 by cam 376, said roller is moved into engagement with the cam 378 as the carriage completes its tabulating movement and will impart a counterclockwise movement to cam shoe 378. Cam shoe 378 has connection with a cam shoe 379, pivotally supported at 380 upon the left end of bar 195, through means of a tie rod 381. Tie rod 381 also has connection with cam shoe 196 through means of pin 172 fast to said rod and having engagement with L-shaped slot 173 of said cam, as earlier described.

With the platen carriage placed to the right, corresponding to the left hand starting columnar position, roller 197 is positioned above the cam shoe 379 so that with roller 197 in normal raised position, cam shoe 379 will be in its lowered or clockwise position as seen in Fig. 7. At such times, cam shoes 196 and 378 through tie rod 381 will also be held in a clockwise position and wherein said cams are adapted for cooperation with roller 197 only when said roller is in a lowered position.

Upon a counterclockwise operation of cam shoe 378 by the depression of roller 197 above described, rod 381 will first carry pin 172 leftward in slot 173 to unlock cam 196 and thereafter pin 172 will impart counterclockwise movement to cam shoe 196 to displace said cam out of effective cooperation with the depressed roller 197 so that the carriage now continues its return movement without interruption. A leftward movement of the rod 381, however, also imparts counterclockwise movement to the cam shoe 379 and thereby raises the cam face of said shoe for subsequent contact with roller 197 as the carriage completes its return movement. Engagement of cam shoe 379 with roller 197 imparts a clockwise movement to the cam shoe 379 and, through tie rod 381, restores cam shoes 196 and 378 to their raised positions, and a rightward movement of pin 172 along slot 173 again locks cam shoe 196 in set position, wherein a return movement of the carriage will be caused to be interrupted relative to the debit columnar position for the purpose and in the manner previously described.

In the above described operation, the movement of cam shoe 379 is limited by the engagement of pin 172' with the flanged bar 195 so that as the carriage finally moves into position of rest, cam shoe 379 acts to lift roller 197 to its normal upward position, thereby pulling the latch 328 (Fig. 4) out of engagement with pin 331 to terminate operation of the return clutch, and concluding the posting sequence of operations.

While the invention above described setting forth improved means for controlling automatic return operations of the platen carriage, which means are independent of a control by the carriage, is particularly adaptable to the printing of statement and ledger sheets in original print, it is understood that the invention is not limited to this mode of operation, but is equally applicable to various other forms of work, the flanged program bars 1 and 195 adapted to be manually indexed in well known manner to displace one set of the described cams and tabulating stops while bringing another relative to appropriate columns into effective position.

One such form of work is that of the posting of a customer's account, such as illustrated below, which involves the keeping of an analysis record in connection with special cost involved in the handling of certain items of the account.

| 1 | 2 | 3 | 4 | 5 |
|---|---|---|---|---|
| Old Bal. | Debit | Credit | Bal. | Analysis |
| $500.00 | $10.00 | | $490.00 | |
| | 15.00 | $50.00 | 525.00 | |
| | 25.00 | 100.00 | 600.00 | $5.00 |

In such accounts the platen carriage would tabulate from the last preceding columnar position 4 into the analysis columnar position 5 for items involving special cost, but if the last operation of the machine relates to an item not requiring a charge, it would be unnecessary for the carriage to tabulate to the analysis position.

Means for selectively determining the columnar position from which the platen carriage is to be automatically returned therefor, is controlled as will be described.

In the following description, the character of registration performed upon the register wheels is controlled by the operating control keys in the well known manner fully disclosed in the reference patents.

In making entries upon the first line of the statement form sheet illustrated above, an old balance ($500.00) is set up on digit keys 215 with the paper carriage in the column 1 position. The machine is set into operation by depression of the plus bar 114 to enter the old balance into the accumulator wheels of the register and to print the amount upon the record sheet. After the printing mechanism has operated, the carriage will then tabulate in regular manner to column 2, corresponding to the debit columnar position of the form sheet. A debit value ($10.00) is now set up on the keyboard and a machine cycle of operation initiated by means of the minus bar 274 to subtract the debit amount from the register and to print said amount upon the record sheet. In said operation, however, the operator, having observed that a succeeding operation is to be a second debit item entry, will also simultaneously with operation of the minus bar operate balance lever 201 rearwardly. Therefore, during a printing cycle of operation at this time the shoulder 309 (Fig. 4) of link 307 is caused to move into rearward engagement with lug 310 of disc 311 as heretofore described. Also following a cycle of operation the carriage will now skip tabulate through column 3 to the 4th or balance columnar position of the record sheet, as in the manner earlier described.

With the platen carriage in the balance columnar position, a sub-total operation is then initiated by use of the sub-total key 277 in well known manner to print the value $490.00 from the register, and this now being a second machine cycle of operation following use of the balance key 201, an automatic return operation of the carriage is effected as in the manner set forth for dual posting operations. A return movement of the carriage, however, at this time, will be interrupted by a cam shoe 196 (Fig. 7) related to the 2nd or debit columnar position, in the manner fully described for dual posting operations.

The second debit item ($15.00) is now set up on digit keys 215 and entered as before by means of the subtract key 274. At this time, however, the operator, noting that the succeeding operation is to be a credit entry, will not operate lever 201 and following this cycle of operation the carriage consequently will tabulate in the usual well known manner to the adjacent column 3 which corresponds to the credit column of the record sheet. A credit item ($50.00) is set up on keys 215 and since the next entry ($25.00) to follow the credit entry is to be a third debit item in column 2, the credit entry is made in column 3 by a rearward movement of balance key 201, following which the carriage again tabulates to the fourth or balance columnar position. In the 4th column a sub-total key operation prints the new balance, now $525.00, and this again being a second machine cycle following use of the balance key the shoulder 309 of disc 311 will again rock shaft 199 to set the means for automatically effecting a return movement of the platen carriage to column 2, ready for the third debit entry.

The third debit item entry ($25.00) will be followed by another credit entry ($100.00) and the debit entry in column 2, therefore, is again made by means of minus bar 274 only and following which the carriage will tabulate to the credit column 3. The operator now notes that the credit item ($100.00) is an entry involving the retaining of special data in the analysis column and will accordingly in this instance initiate the credit operation by means of the plus bar 114. At the completion of the credit operation, the platen carriage will then tabulate as before to the 4th or balance columnar position. The operator has also noted that there are no further items to be entered and now in lieu of a sub-total operation will operate the total key 278 to print the new balance of $600.00 and the register thus will remain zeroized.

In the later series of entries the balance lever 201 has remained in its normal position of rest and therefore shoulder 309 has remained out of effective cooperation with the lug 310 of disc 311 and the automatic carriage return means remains ineffective so that following the balance printing operation the platen carriage now in lieu of returning from column 4 will tabulate to a 5th or analysis columnar position.

An amount ($5.00) constituting the analysis data required is now set up on keys 215 and printed upon the record sheet through a non-add key operation, to leave the register cleared in well known manner.

In the final analysis operation, the carriage, being in its last place position, the last place control cams 376 and 378 earlier described will act to disable the cam shoe 196 related to the debit columnar position and upon operation of the carriage return means, the carriage then returns to its original column 1 starting position, all as in the manner set forth in connection with dual posting operations.

*Means to modify control of automatic carriage return*

Figure 11:
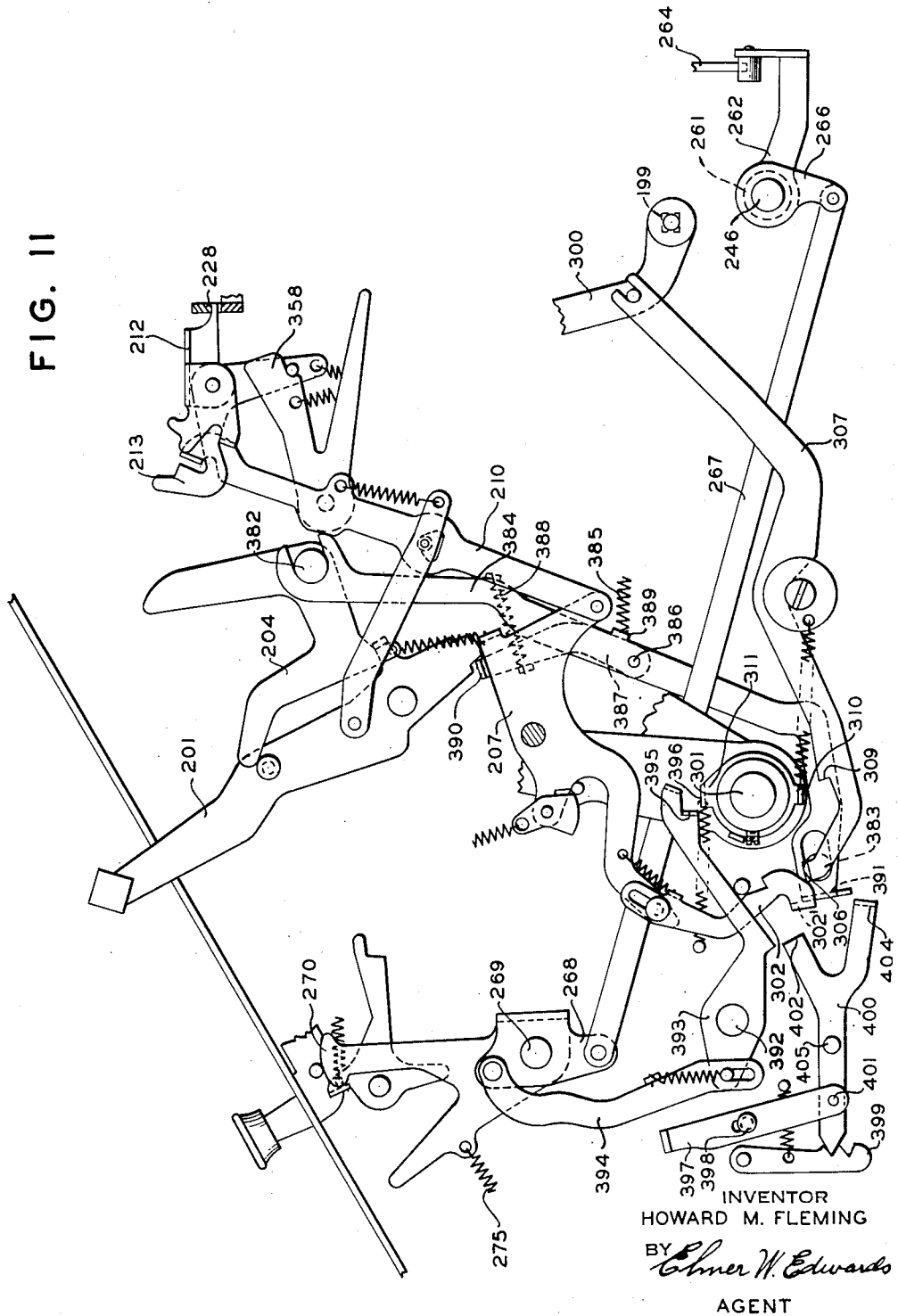
Fig. 11 is a right-side elevation view of means for modifying operation of the carriage return control devices.

To facilitate the program of operations required for the various posting routines to which the invention is applicable, means are provided, as shown in Fig. 11, for modifying an operation of the automatic carriage return control devices. The devices of Fig. 11 provide that an automatic operation of the carriage return mechanism following the second cycle of operation of the cyclic devices may be disabled when the skip tabulating lever 201 is adjusted to its rearward position. Thus the carriage return control means would then be adjusted to effective position only when lever 201 is moved to its forward position, suitable on and off control means for the above devices being provided as will be described.

Additional means, also under control of said on and off means, provides that at such times wherein a second cycle of operation following use of key 201 involves a sub-total operation, the automatic operation of the carriage return clutch is delayed until after a third machine cycle of operation, in the manner and for the purpose as hereinafter described.

Slideably mounted upon suitable studs 382—383 fast in the right end frame of the machine is a slide member 384 normally held in rearward position by means of a spring 385. Pivoted to the slide 384 at 386 is a yieldable pawl biased in a clockwise direction by means of its spring 388 against the lug 389 of slide 384, spring 388 being secured at one end to the slide 384 and at its other end to pawl 387. A lug 390 of pawl 387 is positioned forwardly of the lower end of the lever 201 and slide 384 is provided at its lower end with a projection 391 positioned rearwardly of a lug 302' formed on the pawl 302, pivoted upon lever 207 as earlier described. In a rearward clockwise operation of lever 201 the lower forward edge of said lever is adapted to engage lug 390 and through yieldable spring connection 388 will cause slide 384 to be moved forwardly. Upon forward movement of slide 384, projection 391 engages lug 302' and rocks pawl 302 in a clockwise direction, so that said pawl is now held from engaging projection 306 of the link 307 following release of lever 207 in the rearward clockwise operation of lever 201. Thus link 307 will now remain in its lowered inactive position relative to lug 310 at the end of the first machine cycle of operation, and in a subsequent second machine cycle of operation the lug 310 will move idly past shoulder 309 of link 307 and no operation of the carriage return means will be effected. During the rearward movement of lever 201, finger 210 will be set to cause an operation of the lever 212 and effect a skip tabulating movement of the platen carriage as before, and a suitably placed pin corresponding to pin 240 (Fig. 7) stops the carriage in the desired columnar position as in the manner earlier described.

A forward operation of the lever 201 effects a skip tabulation of the carriage until stopped by a suitably placed pin 240a and will also set the control means to effect an automatic operation of the carriage return means following a second machine cycle of operation, all as in the manner previously described.

One contemplated mode of operation to which the above modification is particularly adapted is that, as hereinafter described, of a bank posting routine involving lines of entries for balances, checks and deposits and including an analysis column for data, the presence or absence of which is determined in accordance with the character of the entry made in the deposit column, and wherein the deposit column precedes and is non-adjacent to the said analysis column.

In the posting of a customer's checking account such as that illustrated below, the old balance is entered in the old balance column on the journal sheet at the beginning of a line of posting. One or more checks drawn against the account may then be entered in the check columns and the amount of any deposit to the account is entered in the deposit column, following which the new balance is then printed in the new balance column. Thereafter, the platen carriage, in accordance with the manner, as will be described, in which the entries are made in the deposit column is either caused to be returned automatically to the starting columnar position or will tabulate to the next succeeding columnar position. Certain deposit entries require that a record be kept of charges incurred in the handling of the account and at such times said charges are printed in the analysis column adjacent and to the right of the new balance column. The operator, therefore, in making a deposit entry, notes whether or not the entry requires a tabulation of the carriage to the analysis column or is to be returned automatically from the new balance columnar position to its starting position.

To best illustrate the manner and mode of operations to which the devices disclosed herein will respond, a series of typical posting routines would be effected as follows:

| 1 | 2 | 3 | 4 | 5 | 6 | 7 |
|---|---|---|---|---|---|---|
| Journal | Statement | | | | | Record |
| Old Bal. | Check | Check | Deposit | New Bal. | New Bal. | |
| $50.00 | $10.00 | | $15.00 | $45.00 | $45.00 | |
| 45.00 | | | 20.00 | 65.00 | 65.00 | $5.00 |
| 65.00 | 15.00 | | | | 80.00 | 80.00 | |

An amount of $50.00 is entered in column 1 upon the journal sheet by means of a plus bar operation, following which the member 184 (Fig. 6) releases the carriage for tabulation in the usual manner to the adjacent column 2 which corresponds to a check column of the statement sheet. Assuming we have a single check of $10.00 and a deposit entry of $15.00 to be made, the operator will make the $10.00 check entry by means of a rearward operation of the lever 201 so that following the check printing operation the carriage will skip tabulate in the manner described, through the check column 3 and until stopped by a pin 240 (Fig. 6) related to the deposit column 4. In the above operation the rearward movement of lever 201 acts through slide 384 (Fig. 11) to disable pawl 302 so that link 307 now remains in lowered position, and is therefore inoperative in a succeeding machine cycle of operation. The deposit entry of $15.00 does not require a data entry in the analysis column and the carriage is therefore to be subsequently automatically returned from the New Bal. column 6 without tabulating into the analysis column. The deposit entry at this time, therefore, is made by a forward operation of lever 201, which as earlier set forth, initiates a machine cycle of operation and effects a carriage tabulation until stopped by a pin 240ª related to the new balance columnar position 5. As before described, in a first machine cycle of operation following the forward movement of lever 201, the link 307 is caused to be raised to an effective setting relative to the lug 310 so that the carriage power return means would be operated automatically by a succeeding machine cycle of operation. In the present series of operations, however, it is desired that a sub-total be printed in column 5 which is thereafter to be followed by an automatic total taking operation to reprint the total in a new balance column 6 related to the analysis data form sheet.

The following means, therefore, are provided to disable an operation of link 307 by the lug 310 until after a third machine cycle of operation whenever a sub-total operation is to be effected.

Fulcrumed at 392 to the right end framing of the machine is a latch member 393, the forward end of which has link connection 394 with the sub-total control, lever 268, said lever being connected through link 267 to the arm 266 operated by the cam 264 on the platen carriage in automatic sub-total operations, as heretofore described. For operations other than sub-total the spring 275 acting through lever 268 and link 394 holds latch member 393 in a counter-clockwise direction, whereby a laterally bent lug 395 of said latch will be held upwardly out of engaging position with the shoulder 396 of disc 311. In the above series of operations, however, upon tabulation of the carriage to the column 5 position the sub-total control cam 264 imparts a clockwise movement to lever 268 and link 394 thereupon rocks latch 393 in a clockwise direction to position the lug 395 forward of shoulder 396 of the disc 311. During the sub-total cycle of operation for printing the new balance in column 5, therefore, disc 311 will be prevented from moving and no rearward movement is imparted to link 307 for releasing the power return clutch at this time. Since link 307 is not moved rearwardly at this time, the lug 306 of said link remains in engagement with pawl 302, so that shoulder 309 of link 307 is held in raised position for engagement with lug 310 of disc 311 in a subsequent cycle of operation.

At the completion of the sub-total operation in column 5 the platen carriage again is released by member 184 (Fig. 6) in the regular well known manner for tabulation to the adjacent column 6 where a cam, such as 242ᵃ (Fig. 7) will effect operation of the total taking devices as earlier described. During the total taking cycle of operation, lug 310 (Fig. 11) will now engage shoulder 309 and move link 307 rearwardly to effect automatic operation of the carriage return means, whereupon the carriage will be returned to the starting columnar position 1 as in the manner earlier described.

In the following series of operations there are no check entries and the deposit entry is one involving a charge, the data of which is to be entered in the analysis column.

In lieu of a plus bar operation, the old balance entry of $45.00 in the present example is entered in column 1 of the journal sheet by means of a rearward operation of the lever 201. Following said entry, therefore, the carriage will skip tabulate through the check columns until brought to rest in the deposit column 4 in the manner as described. Also, slide 384 again disables engagement of pawl 302 with slide 307 so that no return movement of the carriage will be effected upon a subsequent deposit entry. Since the deposit entry ($20.00) is one, the character of which requires that an entry be made in the analysis column, the operator will, at this time, enter the deposit entry by means of a plus bar operation. Following the deposit entry, the carriage then tabulates in regular manner to the adjacent or new balance columnar position 5 where an automatic sub-total operation will be effected as before described and the carriage thereafter again tabulates in regular manner to the new balance column 6. Here, again, cam 240 effects an automatic totalizing operation, but in this case, link 307 has remained in its lowered position and no carriage return operation is caused to be effected. Finger 184 (Fig. 6), however, in well known manner releases detent 7 from bar 1 to cause a regular tabulating movement to the analysis columnar position 7. An entry of $5.00 will be caused to be printed in the analysis column through means of a non-add machine cycle of operation in well known manner, and this being the last place columnar position, the cam means 376—378 earlier described again will cause a return of the carriage to the column 1 position.

In the final illustrated line of entries, the old balance of $65.00 will be entered by means of the plus bar and the carriage thereafter will tabulate to the adjacent check columnar positions as before. Since there is no deposit entry at this time, however, the check entry of $15.00 is now made by means of a forward (counter-clockwise) operation of lever 201 so that the latch 358 (Fig. 11), as in the manner earlier described, will now permit the carriage to skip tabulate through the deposit columnar position 4 directly to the new balance column 6 where a suitable cam 360 (Fig. 7) serves as heretofore described to release latch 358 in bringing the carriage to rest. So that the carriage will tabulate to column 6 in lieu of returning, operation of the automatic sub-totaling means by cam 264 will again disable operation of the automatic carriage return control devices while shoulder 309 of link 307 will remain in engaging position of lug 310 as before described. An automatic total taking cycle of operation will now follow and, as before described in connection with the first line of entries, cause lug 310 to move link 307 rearwardly and effect an operation of the power return means to return the platen carriage to its starting position.

So that the automatic carriage return means may be selective for operations in the use of lever 201 in both directions of its movement or in a rearward movement only of said lever, a manually adjustable lever 400 is provided adapted in one position to render operation of the latch 393 and the slide 384 effective, while in another position of adjustment said means will act to block operation of the latch 393 and the slide 384.

Lever 400 is pivotally mounted to the framing at 405 and is held in either of two adjusted positions by means of a suitable click 399 as shown. A lever 397 pivoted at 401 to lever 400 is provided with a laterally bent finger portion which permits adjustment of lever 397 by the operator. In a counter-clockwise setting of lever 400 a suitable projection 402 thereof holds latch 393 in raised position while at the same time a second projection 404 of lever 400 is positioned forwardly of the projection 391 to prevent an operation of the slide 384. Thus the automatic carriage return means in this adjustment would be effective for an operation in either direction of operation of lever 201.

A clockwise adjustment of lever 400 on the other hand permits of a subsequent operation of the latch 393 and the slide 384, in which case the automatic carriage return means would be disabled when lever 201 is pushed rearwardly, and operable therefor only when lever 201 is pulled to its forward position.

Having now described an improved means for controlling the automatic operations of power operated devices for returning the platen carriage of a listing calculator or the like wherein said means is independent of any control by the carriage, and the mode of operation for controlling operations of said carriage to obtain a dual posting of records in original copy with simplicity and automaticity including a selective order return operation of the carriage, what I claim is:

1. In a machine of the class specified, the combination comprising registering and printing devices, a traveling carriage movable to a plurality of columnar positions, means for tabulating said carriage in one direction, cyclic operating means for the registering and printing devices and for releasing said tabulating means, manipulative control keys for effecting operation of said cyclic operating means, and power operated carriage return means for returning the carriage in the opposite direction; control devices for said return means including means conditioned upon manipulation of a selective control key and subsequently adjusted by the cyclic operating means to an active set condition upon the completion of one cycle of operation of said operating means to render said control devices effective for subsequent operation in a following cycle of operation of said operating means, and wherein said control devices are operable by the cyclic operating means in said following cycle of operation thereof to effect operation of said return means whereby a return movement of the carriage is effected automatically by alternate cycles of operation of the cyclic operating means independently of the columnar positions of said carriage.

2. The invention according to claim 1 including a hit and miss device operable by the cyclic operating means, means operable by the cyclic operating means for adjusting said hit and miss device to effective condition during a first cycle of operation of the cyclic operating means for a subsequent automatic operation thereof by the cyclic operating means in said alternate cycles of operations of said cyclic operating means effected in any columnar position of the carriage.

3. The invention according to claim 1 including a hit and miss device, means operable by the cyclic operating means during a first cycle of operation to adjust said hit and miss device to active condition for an operation in a subsequent second operation of the cyclic operating means and independently of said carriage to effect thereby during said second cycle of operation an operation of said carriage return means following said second operation of said cyclic operating means.

4. The invention according to claim 3 wherein the hit and miss control device for the carriage return means includes a member adjusted to an active condition by the cyclic operating means in a first cycle of operation initiated by a selective operating control key and which member when so adjusted is thereafter caused to be operated by a second cycle of operation of the cyclic operating means effected with the carriage in any columnar position to cause operation of the carriage return means following such second cycles of operation and thereby effect an automatic return movement of the carriage from various tabulated columnar positions.

5. The invention according to claim 4 including a yieldable means adjusted from an inactive to an active position upon operation of said selective control key whereby said yieldable means in said active position is adapted for effecting a setting of the hit and miss member from an inactive to an active position, and means also settable upon operation of said selective control key and operable thereafter by the cyclic operating means in a first cycle of operation thereof to effect an operation of the first said adjusted means and thereby set the hit and miss member to its active position for a subsequent operation by the cyclic operating means in a succeeding cycle of operation thereof to effect operation of the carriage return means.

6. The invention according to claim 5 having means reciprocated by the cyclic operating means in a cycle of operation thereof, and wherein the hit and miss device includes a spring charged member yieldably operable under control of said reciprocated means and adapted for imparting a movement to the said adjusted member for effecting an operation of the carriage return means, wherein said movement will effect disengagement of said adjusted member from said adjusting means, and wherein the spring charged member will thereafter maintain the adjusted member in operated position.

7. The invention according to claim 6 and having secondary devices operable by the cyclic operating means for effecting an operation of the carriage return means, and wherein said movement of the adjusted member acts to condition said secondary devices for effecting an operation of the carriage return means, and wherein the said reciprocated means is adapted by a lost motion operation to thereafter return the said spring charged member and release said adjusted member after said secondary devices have been conditioned for effecting operation of the carriage return means.

8. In a machine of the class specified the combination having registering and printing devices, a traveling carriage movable to a plurality of columnar positions, means for tabulating said carriage in one direction, cyclic operating means for the registering and printing devices, manipulative control keys for effecting operation of said cyclic operating means, means under control of selective cyclic operating control keys to effect skip tabulating operations of the carriage to selective non-adjacent columnar positions, and power operated carriage return means to return the carriage in the opposite direction; means operable by the cyclic operating means and normally ineffective of causing an operation of the carriage return means, control devices for said means settable under control of the skip tabulating keys for operation by the cyclic operating means in a cycle of operation thereof incident to a manipulation of said keys to condition said ineffective means to effective position for operation by the cyclic operating means to effect operation of the carriage return means, and wherein the means operable by the cyclic operating means thereafter in a cycle of operation of said means following the said skip tabulating cycle of operation invariably will effect an operation of the carriage return means.

9. In a machine of the class specified the combination comprising registering and printing devices, a traveling carriage movable to a plurality of columnar positions, means for tabulating said carriage in one direction, cyclic operating means for the registering and printing devices and for releasing said tabulating means to tabulate the carriage to adjacent columnar positions, manipulative control keys for effecting operation of said cyclic operating means, means under control of a selective cyclic operating control key to effect skip tabulating operations of the carriage to selective non-adjacent columnar positions in accordance with the manner of operation of said key, and power operated carriage return means for returning the carriage in the opposite direction; means operable by the cyclic operating means for automatically effecting an operation of said return means including control devices therefor settable through operation of the skip tabulating key concurrently with a control by said key of said skip tabulating means whereby the first operation of the cyclic operating means occurring after operation of the skip tabulating key will act to adjust the said means adapted for effecting an operation of the return means to active condition and wherein the return means is thereafter operated by the cyclic operating means in a cycle of operation of said means occurring following said skip tabulating operations of the carriage.

10. The invention according to claim 9 including clutch control means operable under control of the skip tabulating key for effecting an operation of the cyclic operating means, means normally operable for restoring said clutch control means and terminating a cycle of operation of the cyclic operating means, control means operable upon selective operation of said skip tabulating key to effect a skip tabulating movement of the carriage to a predetermined columnar position, means controlled by said skip tabulating key and adjustable to an active condition by the above operation of the cyclic operating means for a subsequent operation by said operating means in a following cycle of operation thereof, means operable by the cyclic operating means in said following cycle of operation to effect a movement of said adjustable means when in said active condition for the purpose of effecting operation of the carriage return means, and means operable under control of the said skip tabulating control means for rendering the said means for terminating a cycle of operation ineffective and thereby automatically effect said following cycle of operation.

11. In a machine of the class described the combination comprising registering and printing devices, a traveling carriage movable to bring work sheets supported thereon to columnar printing positions, means for tabulating said carriage in one direction, cyclic operating means for the registering and printing devices and adapted for releasing said tabulating means, skip column tabulating means, a manipulative control key for effecting an operation of the cyclic operating means and adapted for controlling said skip column tabulating means in accordance with selective manipulation of said key to effect carriage tabulation from an initial starting columnar position to a non-adjacent columnar position, totalizing means, control means operable in said non-adjacent columnar position to effect operation of said totalizing means and for controlling a sub-total cycle of operation of said cyclic operating means, and power operated carriage return means for returning the carriage in the opposite direction; means settable under control of said skip tabulating key and operable by said cyclic operating means in said first cycle of operation thereof to condition means to active position for a subsequent movement in the said totalizing cycle of operation of the cyclic operating means, means operable by the cyclic operating means in said second cycle of operation to effect the said movement of said actively conditioned means, and control means rendered effective thereby to cause an automatic operation of said carriage return means.

12. The invention according to claim 11 including control means adapted to automatically restore the means effective for operating the carriage return means and interrupt a return movement of the carriage relative to the columnar position intermediate of said initial starting position and said skip tabulated columnar position, means for locking said control means in interrupting control position, and wherein said interrupting means also acts to restore to normal condition the said means movable in said second cycle of operation.

13. The invention according to claim 12 and including means operable upon a subsequent tabulating movement of the carriage to release said locking means and restore the said control means effective for interrupting return movement of the carriage to an ineffective position and thereby permit full return movement of the carriage to its initial starting columnar position.

14. The invention according to claim 13 including means operable when the carriage is returned to said initial starting position to reset and lock said carriage return interrupting means in effective position for interrupting a carriage return movement.

15. The invention according to claim 12 and including a cyclic operating clutch, control means for said clutch operable by the skip tabulating key to release said clutch and cause operation of the cyclic operating means, means operable during said cycle of operation to automatically disengage the clutch and terminate the cycle of operation, means settable in a plurality of selective control positions in accordance with selective manipulations of the skip tabulating key wherein a manipulation of said key to a given position will cause said settable means to effect a skip tabulating operation of the carriage from the said interrupted return columnar position to a non-adjacent columnar position and means operable by the skip tabulating means in said operation to render the clutch disengaging means ineffective and thereby condition the clutch control means for automatically effecting a second cycle of operation of the cyclic operating means and wherein during said second cycle of operation the carriage return means will again be automatically operated to return the carriage to the said interrupted columnar position.

16. The invention according to claim 15 having value installing means, clearout devices for said value installing means operable by the cyclic operating means, a control train for said clearout devices including a member on the shiftable carriage adapted with the carriage in the interrupted return columnar position to render said clearout means ineffective, and wherein displacement of said member by movement of said carriage thereafter sets the control train to effective position for effecting a clearout operation of the value installing means during said automatic second cycle of operation of the cyclic operating means in said skip tabulated columnar position of the carriage.

17. The invention according to claim 15 and including means operable by the skip tabulating control means in effecting a skip tabulating operation of the carriage from said interrupted return columnar position to said non-adjacent columnar position to disable operation of the said automatic totalizing means as the carriage tabulates through the columnar position intermediate of said interrupted return columnar position and said non-adjacent columnar position.

18. The invention according to claim 15 having program control devices for the registering means under control of the carriage and wherein with said carriage in said tabulated position non-adjacent to said interrupted return columnar position said program means will effect non-add control operations of said registering means during said automatic second cycle of operation of the cyclic operating means.

19. In a machine of the class described, the combination comprising value installing means, registering and printing devices, clearout means for the value installing means, totalizing means, a traveling carriage movable to a plurality of columnar positions, skip column tabulating control means, cyclic operating means for the registering and printing devices adapted for operating the clearout means and for releasing the tabulating means, power operated means for returning the carriage in the opposite direction, control means for said return means including means conditioned in an initial operation of the cyclic operating means and thereafter operable in a subsequent cycle of operation thereof to effect an operation of said carriage return means, a manually operable lever adapted to effect an initial operation of the cyclic operating means and to render the skip tabulating means effective for tabulating the carriage to a non-adjacent columnar position, means under control of said lever and operable by the cyclic operating means during said initial operation for conditioning the carriage return control means to effective position, means for automatically effecting an operation of the cyclic operating means in said non-adjacent columnar position, and means operable by the cyclic operating means during said operation to cause an opertion of the effective conditioned carriage return control means and thereby effect operation of the power operated carriage return means, whereby the carriage is caused to be automatically returned following said cyclic operation in the non-adjacent columnar position.

20. The invention according to claim 19 wherein a machine of the class described is arranged to perform a series of related operations following an operation of said manually operated lever in a selective manner with the carriage located in left-hand printing columnar position, including an initial registering and printing cycle of operation initiated by said operation of said lever, means operable during said initial operation for automatically clearing the value installing means, means operable under control of said lever for effecting an automatic skip tabulating operation of the carriage to a non-adjacent columnar position following said initial cycle of operation, means operable by the carriage during said movement thereof to cause operation of the totalizing means including means controlled by the carriage for effecting a sub-total cycle of operation for the purpose of reprinting in said non-adjacent column a value registered during said initial cycle of operation, means under control of said manually operated lever for thereafter automatically effecting a return movement of the carriage, said means including a member movable by the cyclic operating means into co-acting relationship during said initial cycle of operation with a cyclically driven member and wherein said first member is thereafter operated by said cyclically driven member during said sub-total cycle of operation to effect an operation of the carriage return means, and means for automatically terminating said return movement of the carriage in a columnar position intermediate said starting columnar position and said non-adjacent columnar position.

21. The invention according to claim 20 wherein operation of said manually operated lever in a different selective manner is adapted with the carriage in said intermediate columnar position to perform a series of uninterrupted operations for each transaction including a registering and printing operation in said intermediate columnar position, means under control of the carriage in said intermediate columnar position for automatically disabling the clearout operation of the value installing means, means controlled by said operation of said manually operated lever for effecting an automatic skip tabulation of the carriage to a non-adjacent columnar position, means conditioned by said operation of said manually operated lever to cause an automatic cycle of operation of the cyclic operating means in said non-adjacent columnar position to effect a repeat printing operation, register control devices under control of the carriage and adapted to effect a non-add operation during said repeat printing cycle of operation, control means for thereafter automatically effecting a return movement of the carriage including devices under control of said manually operated lever and means moved by the cyclic operating means into co-acting relationship during said first described operation in said intermediate columnar position and adapted for a subsequent operation by the said cyclic operating means during the repeat printing cycle of operation and effect thereby automatic operation of the carriage return means whereby the carriage will be returned to the said intermediate starting columnar position following said repeat printing cycle of operation.

22. The invention according to claim 21 wherein the means for disabling the clearout means for the value installing means also serves to prevent an operation of the automatic totalizing means and sub-total cycle of operation during the tabulating movement of the carriage from the said intermediate columnar position to the said non-adjacent repeat printing columnar position.

23. In a machine of the class described, the combination comprising value installing means, registering and printing devices, a traveling carriage movable to a plurality of columnar positions, means for tabulating the carriage in one direction, cyclic operating means for said registering and printing devices and for releasing said tabulating means, cyclic operations control keys including a lever manipulatable to a plurality of positions and adapted to control a tabulating movement of said carriage to predetermine columnar positions in accordance with selective manipulations of said lever, power operated carriage return means for returning the carriage in the operated direction; control devices for effecting an automatic operation of said carriage return means including means responsive to operations of said lever, means adjustable by said responsive means to an active position by the cyclic operating means in a cycle of operation thereof initiated by said manipulations of said lever, a yieldable member movable by the cyclic operating means and adapted to effect an operation of said adjusted means in a subsequent cycle of operation of the cyclic operating means following said initiated cycle of operation and thereby automatically effect an operation of said carriage return means in said subsequent cycle of operation, and means operable in one selective movement of said manipulatable lever to disable said adjustment of said control devices for the purpose of disabling said automatic operation of the carriage return means.

24. The invention according to claim 23 wherein the said means responsive to an operation of said manipulatable lever includes a latch adjusted upon said operation of said lever for engagement with said adjustable means, and wherein said latch during said initial cycle of operation of the cyclic operating means will act to adjust the said adjustable means to an active position relative to the said yieldably movable member, and wherein a subsequent operation of the adjustable means by said movable member in effecting an automatic operation of the carriage return means during a second operation of the cyclic operating means also will effect disengagement of the said adjustable means from said latch.

25. The invention according to claim 24 wherein the means operable by the manipulatable lever in one selective movement thereof includes a slide movable thereby to rock said latch out of cooperative engagement with the said adjustable means and thus prevent the said adjustment of said means by said latch and thereby disable the said automatic operation of the carriage return means by the said adjustable means.

26. The invention according to claim 25 including an adjustable control means settable in one control position to permit the said movement of said slide and in another control position to prevent the said movement of said slide, whereby an operation of the carriage return means by the said adjustable means incident to said selective movement of the manipulatable lever may be enabled or disabled.

27. In a machine of the class described, the combination comprising value installing means, registering and printing devices, a traveling carriage movable to a plurality of columnar positions, means for tabulating the carriage in one direction, cyclic operating means for said registering and printing devices and for releasing said tabulating means, cyclic operations control keys including a lever manipulatable to a plurality of positions and adapted to control a tabulating movement of said carriage to predetermined columnar positions in accordance with selective manipulations of said lever, power operated carriage return means for returning the carriage in the opposite direction, and total taking devices including means for controlling a sub-total operation of said devices; control devices for effecting an automatic operation of said carriage return means including means responsive to different positions of operations of said lever and means adjustable by the cyclic operating means through said responsive means to an active position in a cycle of operation initiated by a manipulation of said lever, a yieldable member movable with the cyclic operating devices and adapted to effect an operation of said actively adjusted means in a cycle of operation following said initiated cycle of operation to automatically effect an operation of said carriage return means in said later cycle of operation, and means operable by the sub-total control means for preventing said operation of the yieldably movable member during a sub-total operation of the cyclic operating means whereby operation of the said actively adjusted means will be prevented and thereby disable the said automatic operation of the carriage return means when said later cycle of operation involves a sub-totaling operation.

28. The invention according to claim 27 and including settable control devices adapted in one set position to permit of said operation of the said means operable by the sub-total control means in preventing operation of the yieldably movable member, and in another set position to render the said means, operable by the sub-total control means, ineffective of preventing the said operation of the said yieldably movable member.

29. In a machine of the class described, the combination comprising value installing means, registering and printing devices, a traveling carriage movable to a plurality of columnar positions, means for tabulating the carriage in one direction, operating means for said said registering and printing devices and for releasing said tabulating means, cyclic operations control keys including a lever manipulatable to a plurality of positions and adapted to control a tabulating movement of said carriage to predetermined columnar positions in accordance with selective manipulations of said lever, power operated carriage return means for returning the carriage in the opposite direction, and total taking devices including means for controlling a sub-total operation of said devices; control devices for effecting an automatic operation of said carriage return means including means responsive to different positions of operations of said manipulatable lever, a member adjusted to an active position by said responsive means in a cycle of operation of the cyclic operating means initiated by an operation of the manipulatable lever, yieldable means movable by the cyclic operating devices and adapted to impart movement to the said actively adjusted member in a cycle of operation following said initiated cycle of operation and thereby effect an automatic operation of the carriage return means following said later cycle of operation, means adapted in one selective position of said manipulatable lever to disable the said adjustment of said adjustable member to said actively adjusted position and thereby prevent the said automatic operation of the carriage return means in said later cycle of operation, and means operable by the sub-total control means to prevent an operation of the said yieldable means movable by the cyclic operating devices to thereby prevent an operation of the carriage return means in a subsequent sub-totaling operation.

30. The invention according to claim 29 and including manually settable means for concurrently rendering effective or to render ineffective the said means for disabling the means for adjusting the said adjustable member to active position in a selective operation of the manipulatable lever and the said means operable by the sub-total control means in preventing an operation of the means yieldably movable by the cyclic operating means.

31. The invention according to claim 30 and wherein the means responsive to operations of the manipulatable lever for adjusting the said adjustable member to active position in an initial cycle of operation includes a latch, and wherein operation of said adjusted member by the said yieldably movable means in a following cycle of operation in effecting an automatic operation of the carriage return means also effects release of said adjusted member from said latch, and wherein the said disabling of the operation of the movable means by the said means operable by the sub-total control means in said subsequent sub-totaling operation will also disable the release of said adjusted member from said latch, whereby the said adjusted member will remain in active position and is thereafter operated in a subsequent operation of the cyclic operating means to effect an automatic operation of the carriage return means.

References Cited in the file of this patent
UNITED STATES PATENTS

| | | |
|---|---|---|
| 2,012,317 | Muller | Aug. 27, 1935 |
| 2,229,763 | Muller | Jan. 28, 1941 |
| 2,263,033 | Fettig | Nov. 18, 1941 |
| 2,313,982 | Williams | Mar. 16, 1943 |
| 2,597,162 | Mehan et al. | May 20, 1952 |